US012137343B2

(12) United States Patent
Lev

(10) Patent No.: US 12,137,343 B2
(45) Date of Patent: Nov. 5, 2024

(54) VERIFYING A PATH OF A MOBILE WIRELESS DEVICE BASED ON WIRELESS MAPPING

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 440 days.

(21) Appl. No.: 17/164,937

(22) Filed: Feb. 2, 2021

(65) Prior Publication Data

US 2021/0400483 A1  Dec. 23, 2021

Related U.S. Application Data

(63) Continuation-in-part of application No. 16/904,625, filed on Jun. 18, 2020, now Pat. No. 11,611,848.

(51) Int. Cl.
*H04W 12/00* (2021.01)
*H04W 4/80* (2018.01)
(Continued)

(52) U.S. Cl.
CPC .......... *H04W 12/069* (2021.01); *H04W 4/80* (2018.02); *H04W 12/068* (2021.01);
(Continued)

(58) Field of Classification Search
CPC ... H04W 12/069; H04W 4/80; H04W 12/068; H04W 12/71; H04W 12/64; H04W 12/08; H04W 84/12
See application file for complete search history.

(56) References Cited

U.S. PATENT DOCUMENTS 10,510,197 B2 * 12/2019 Baumgarte ........ G07C 9/00309
2013/0260689 A1 * 10/2013 Haverinen ........... H04B 5/0037
455/41.2
(Continued)

FOREIGN PATENT DOCUMENTS

CN      106447870      2/2017

OTHER PUBLICATIONS

Notice of Allowance Dated Dec. 14, 2022 from the US Patent and Trademark Office Re. U.S. Appl. No. 16/904,625. (6 pages).
(Continued)

*Primary Examiner* — Pakee Fang

(57) ABSTRACT

Provided herein are methods and systems for verifying a path in a monitored space, comprising transmitting a device identification (ID) of the mobile wireless device while the mobile wireless device moves through a monitored space, receiving one or more location certificates transmitted, in response to reception of the device ID, by one or more wireless transceivers deployed at a predefined location in the monitored space and having a limited transmission range, each location certificate comprising at least the device ID and a transceiver ID of the respective wireless transceiver, storing the one or more location certificates, and transmitting the one or more location certificates to one or more verification units configured to verify a path of the mobile wireless device in the monitored space estimated according to the predefined location of the one or more wireless transceivers identified by the transceiver ID extracted from the one or more location certificates.

11 Claims, 9 Drawing Sheets

(51) Int. Cl.
    *H04W 12/06*     (2021.01)
    *H04W 12/069*    (2021.01)
    *H04W 12/08*     (2021.01)
    *H04W 12/64*     (2021.01)
    *H04W 12/71*     (2021.01)
    *H04W 84/12*     (2009.01)

(52) U.S. Cl.
    CPC ........... *H04W 12/08* (2013.01); *H04W 12/64* (2021.01); *H04W 12/71* (2021.01); *H04W 84/12* (2013.01)

(56)                References Cited

U.S. PATENT DOCUMENTS

| 2013/0332632 | A1* | 12/2013 | Rathi ...................... H04L 69/24 710/38 |
| 2015/0244711 | A1* | 8/2015 | Venkataraman .... H04L 63/0815 713/168 |
| 2017/0004290 | A1* | 1/2017 | Pedersen ................ H04R 25/70 |
| 2018/0007037 | A1* | 1/2018 | Reese ................. H04L 63/0838 |
| 2021/0112064 | A1 | 4/2021 | Losseva et al. |
| 2021/0400436 | A1 | 12/2021 | Lev |

OTHER PUBLICATIONS

Official Action Dated Aug. 31, 2022 from US Patent and Trademark Office Re. U.S. Appl. No. 16/904,625. (15 pages).

\* cited by examiner

VERIFYING A PATH OF A MOBILE WIRELESS DEVICE BASED ON WIRELESS MAPPING

RELATED APPLICATION(S)

This application is a Continuation-in-Part (CIP) of U.S. patent application Ser. No. 16/904,625 filed on Jun. 18, 2020, the contents of which are all incorporated by reference as if fully set forth herein in their entirety.

FIELD AND BACKGROUND OF THE INVENTION

The present invention, in some embodiments thereof, relates to verifying a path of a mobile wireless device, and, more specifically, but not exclusively, to verifying a path of a mobile wireless device in a monitored space based on wireless mapping of the mobile wireless device by wireless devices deployed in predefined locations in the monitored space.

Authenticating and validating users prior to granting them access to restricted areas and/or restricted resources (e.g. terminals, networks, etc.) may be highly desirable for a plurality of applications, systems and/or infrastructures.

While users may be authenticated in a plurality of methods and techniques as known in the art, authenticating users based on their physical location and/or travel paths may provide high benefit in particular in sensitive public locations, for example, office areas, buildings, facilities, schools, hospitals, sports stadiums, train stations, airports and/or the like in which the travel path of people may be highly indicative of their covert intentions.

Moreover, the path tracking may be further applied for tracking disinfection apparatuses manually and/or automatically operated to disinfect public space, and more so in times of epidemic outbreaks such as the outbreak of the COVID-19 epidemic when frequent and efficient disinfection and sanitization must be practiced.

SUMMARY OF THE INVENTION

According to a first aspect of the present invention there is provided a computer implemented method of verifying a path in a monitored space, comprising using one or more processors of a mobile wireless device for:
  Transmitting a device identification (ID) of the mobile wireless device while the mobile wireless device moves through a monitored space.
  Receiving one or more location certificates transmitted, in response to reception of the device ID, by one or more wireless transceivers deployed at a predefined location in the monitored space and having a limited transmission range. Each location certificate comprising at least the device ID and a transceiver ID of the respective wireless transceiver.
  Storing the one or more location certificates.
  Transmitting the one or more location certificates to one or more verification units configured to verify a path of the mobile wireless device in the monitored space estimated according to the predefined location of the one or more wireless transceivers identified by their transceiver ID extracted from the one or more location certificates.

According to a second aspect of the present invention there is provided a mobile wireless device for verifying a path in a monitored space, comprising one or more processors executing a code, the code comprising:
  Code instructions to transmit a device identification (ID) of the mobile wireless device while the mobile wireless device moves through a monitored space.
  Code instructions to receive one or more location certificates transmitted, in response to reception of the device ID, by one or more wireless transceivers deployed at a predefined location in the monitored space and having a limited transmission range. Each location certificate comprising at least the device ID and a transceiver ID of the respective wireless transceiver.
  Code instructions to store the one or more location certificates.
  Code instructions to transmit the one or more location certificates to one or more verification units configured to verify a path of the mobile wireless device in the monitored space estimated according to the predefined location of the one or more wireless transceivers identified by their transceiver ID extracted from the one or more location certificates.

According to a third aspect of the present invention there is provided a computer implemented method of verifying a path in a monitored space, comprising using one or more processors for:
  Receiving one or more location certificates from one or more wireless receivers deployed at a predefined location in the monitored space and having a limited reception range. Each location certificate comprising at least a device identification (ID) of a mobile wireless device detected by one of the wireless receivers and a receiver ID of the respective wireless receiver.
  Extracting the device ID and the receiver ID from each of the one or more location certificates.
  Estimating a path of the mobile wireless device in the monitored space according to the predefined location of the one or more wireless receivers identified by their receiver ID.
  Verifying the estimated path with one or more approved paths based on comparison with one or more approved path.

According to a fourth aspect of the present invention there is provided a system for verifying a path in a monitored space, comprising one or more processors executing a code, the code comprising:
  Code instructions to receive one or more location certificates from one or more wireless receivers deployed at a predefined location in the monitored space and having a limited reception range. Each location certificate comprising at least a device identification (ID) of a mobile wireless device detected by one of the wireless receivers and a receiver ID of the respective wireless receiver.
  Code instructions to extract the device ID and the receiver ID from each of the one or more location certificates;
  Code instructions to estimate a path of the mobile wireless device in the monitored space according to the predefined location of the one or more wireless receivers identified by their receiver ID.
  Code instructions to verify the estimated path with one or more approved paths based on comparison with one or more approved path.

According to a fifth aspect of the present invention there is provided a method of mobile wireless devices authentication, comprising using one or more processors of a mobile wireless device requesting access to one or more secure assets for:

Transmitting a device identifier (ID) of the mobile wireless device.

Receiving one or more identity certificates transmitted, in response to reception of the device ID, by one or more wireless transceivers independent from the mobile wireless device and attached to the mobile wireless device. The one or more wireless transceivers having a short transmission range is a battery-less device powered by energy harvested from wireless transmission of the mobile wireless device. The one or more identity certificates comprising at least the device ID and a transceiver ID of the one or more wireless transceivers.

Transmitting the one or more identity certificates to one or more verification units configured to authenticate the mobile wireless device according to the device ID and the transceiver ID.

According to a sixth aspect of the present invention there is provided a mobile wireless device, comprising one or more processors configured to execute a code. The code comprising:

Code instructions to transmit device identifier (ID) of the mobile wireless device.

Code instructions to receive one or more identity certificates transmitted, in response to reception of the device ID, by one or more wireless transceivers independent from the mobile wireless device and attached to the mobile wireless device. The one or more wireless transceivers having a short transmission range is a battery-less device powered by energy harvested from wireless transmission of the mobile wireless device. The one or more identity certificates comprising at least the device ID and a transceiver ID of the one or more wireless transceivers.

Code instructions to transmit the one or more identity certificates to one or more verification units configured to authenticate the mobile wireless device according to the device ID and the transceiver ID.

According to a seventh aspect of the present invention there is provided a method of authenticating mobile wireless devices, comprising using one or more processors for:

Receiving a request from one or more mobile wireless devices to access one or more secure assets.

Transmitting an authentication request to the one or more mobile wireless devices.

Receiving one or more identity certificates from the one or more mobile wireless devices. The one or more identity certificates are created by one or more wireless transceivers physically coupled to the one or more mobile wireless devices. The one or more identity certificates comprising at least a device identifier (ID) of the one or more mobile wireless devices and a transceiver ID of the one or more wireless transceiver.

Authenticating the one or more mobile wireless devices according to the device ID and the transceiver ID.

According to an eighth aspect of the present invention there is provided a system for authenticating mobile wireless devices, comprising one or more processor configured to execute a code, the code comprising:

Code instructions to receive a request from one or more mobile wireless devices to access one or more secure assets.

Code instructions to transmit an authentication request to the one or more mobile wireless devices.

Code instructions to receive one or more identity certificates from the one or more mobile wireless devices. The one or more identity certificates are created by one or more wireless transceivers physically coupled to the one or more mobile wireless devices. The one or more identity certificates comprising at least a device identifier (ID) of the one or more mobile wireless devices and a transceiver ID of the one or more wireless transceiver.

Code instructions to authenticate the one or more mobile wireless devices according to the device ID and the transceiver ID.

According to a ninth aspect of the present invention there is provided a method of authenticating mobile wireless devices based on its geolocation, comprising using one or more processors for:

Receiving a request from a mobile wireless device to access one or more secure assets.

Receiving one or more location certificates for the mobile wireless device from one or more wireless receivers deployed at a predefined location and having a limited reception range. The one or more location certificates comprising at least a device identification (ID) of the mobile wireless device received by the one or more wireless receivers from the one or more mobile wireless devices and a receiver ID of the one or more wireless receives.

Extracting the device ID and the receiver ID from the one or more location certificates.

Verifying an expected geolocation of the mobile wireless device identified by the device ID compared to the predefined location of the one or more wireless receivers identified by the receiver ID.

Authenticating the mobile wireless device based on the verification.

According to a tenth aspect of the present invention there is provided a system for authenticating mobile wireless devices based on its geolocation, comprising one or more processors configured to execute a code. The code comprising:

Code instructions to receive a request from a mobile wireless device to access one or more secure assets.

Code instructions to receive one or more location certificates for the mobile wireless device from one or more wireless receivers deployed at a predefined location and having a limited reception range. The one or more location certificates comprising at least a device identification (ID) of the mobile wireless device received by the one or more wireless receivers from the one or more mobile wireless devices and a receiver ID of the one or more wireless receives.

Code instructions to extract the device ID and the receiver ID from the one or more location certificates.

Code instructions to verify an expected geolocation of the mobile wireless device identified by the device ID compared to the predefined location of the one or more wireless receivers identified by the receiver ID.

Code instructions to authenticate the mobile wireless device based on the verification.

In a further implementation form of the first, second, third and/or fourth aspects, the mobile wireless device is associated with a user verified based on his path through the monitored space.

In a further implementation form of the first and/or second aspects, the mobile wireless device is associated with a disinfection apparatus configured to disinfect one or more surfaces in the monitored space. The path of the associated disinfection apparatus is verified with respect to one or more predefined path. The one or more wireless transceivers are deployed in association with the one or more surfaces.

In a further implementation form of the first and/or second aspects, the disinfection apparatus is configured to project Ultra Violet (UV) light to disinfect the one or more surfaces in the monitored space. The verification of the path of the disinfection apparatus further comprising verifying a predefined projection time of the UV light on the one or more surfaces which is sufficient for effectively disinfecting the respective surfaces.

In an optional implementation form of the first and/or second aspects, the disinfection apparatus is configured to project Ultra Violet (UV) light to disinfect the one or more surfaces in the monitored space. The verification of the path of the disinfection apparatus further comprising verifying a predefined projection time of the UV light on the one or more surfaces which is sufficient for effectively disinfecting the respective surfaces.

In an optional implementation form of the first and/or second aspects, the one or more predefined paths are derived from an estimated path in the monitored space which is determined for one or more mobile device associated with a respective user such that the disinfection apparatus is verified to follow the path of the respective users.

In a further implementation form of the first and/or second aspects, the estimated path is verified based on comparison with one or more approved paths.

In a further implementation form of the first and/or second aspects, the limited transmission range defines a limited space in the monitored space in proximity to the one or more wireless transceiver such that only when located within the limited space the mobile wireless device receives the one or more location certificates transmitted by the one or more wireless transceivers.

In a further implementation form of the first, second, third, fourth, fifth, sixth, seventh, eighth, ninth and/or tenth aspects, the device ID is transmitted periodically and/or continuously.

In an optional implementation form of the first, second, ninth and/or tenth aspects, one or more of the location certificates are encrypted using one or more cryptographic keys available to the one or more wireless transceivers and to the one or more verification units.

In a further implementation form of the first, second, third, fourth, fifth, sixth, seventh, eighth, ninth and/or tenth aspects, one or more of the location certificates further comprise a timestamp indicative of a transmission time of the respective location certificate. One or more of the verification units use the timestamp to timeline the estimated path.

In an optional implementation form of the first and/or second aspects, one or more of the wireless transceivers transmit one or more additional location certificates in case the mobile wireless device exits and re-enters the limited transmission range of the respective wireless transceivers.

In a further implementation form of the first and/or second aspects, one or more of the wireless transceivers are battery-less wireless transceivers powered by energy harvested from the transmission of the mobile wireless device.

In a further implementation form of the third and/or fourth aspects, the limited reception range defines a limited space in the monitored space in proximity to the one or more wireless receivers such that only when located within the limited space the one or more wireless receivers receive the device ID transmitted by the mobile wireless device.

In an optional implementation form of the third and/or fourth aspects, a timeline of the path is estimated according to a timestamp extracted from the one or more location certificates.

In an optional implementation form of the third and/or fourth aspects, one or more of the wireless receivers transmit one or more additional location certificates in case the mobile wireless device exits and re-enters the limited reception range of the respective wireless receivers.

In an optional implementation form of the third and/or fourth aspects, the mobile wireless device is correlated with the associated user based on analysis of one or more images captured at a time of transmission of the location certificate by one or more imaging sensors configured to monitor the predefined location of the one or more wireless receivers.

In an optional implementation form of the third and/or fourth aspects, the path of the associated user through the monitored space is estimated based on detection of the associated user in one or more images captured by one or more imaging sensors deployed in the monitored space.

In a further implementation form of the fifth, sixth, seventh and/or eighth aspects, the one or more verification units are configured to authenticate the mobile wireless device mobile prior to granting the mobile wireless device access to the one or more secure assets. The one or more secure assets are members of a group consisting of: a secure system, a secure service and a secure location.

In a further implementation form of the fifth, sixth, seventh and/or eighth aspects, the short transmission range is defined by one or more personal area network (PAN) protocols.

In a further implementation form of the fifth, sixth, seventh and/or eighth aspects, communication between the mobile wireless device and the one or more wireless transceivers is based on one or more wireless communication protocols. The one or more wireless communication protocol are members of a group consisting of: wireless local area network (WLAN), Wi-Fi, Bluetooth, Bluetooth low energy (BLE) and ZigBee.

In a further implementation form of the fifth, sixth, seventh and/or eighth aspects, the short transmission range defines a close proximity reception area such that only when located within the close proximity reception area, the mobile wireless device is capable of receiving the one or more identity certificates transmitted by the one or more wireless transceivers.

In a further implementation form of the fifth, sixth, seventh and/or eighth aspects, the close proximity reception area is defined by a radius in a range of 5-30 centimeters.

In a further implementation form of the fifth, sixth, seventh and/or eighth aspects, one or more of the identity certificates comprise a one-time password (OTP) randomly generated based on seed associated with the one or more wireless transceivers.

In an optional implementation form of the fifth, sixth, seventh and/or eighth aspects, one or more of the identity certificate are encrypted using one or more cryptographic keys associated with the one or more wireless transceivers.

In a further implementation form of the ninth and/or tenth aspects, the limited reception range defines a limited reception area such that only when located within the limited reception area, the one or more wireless receivers are capable of receiving the device ID transmitted by the mobile wireless device.

In a further implementation form of the ninth and/or tenth aspects, the expected geolocation of the mobile wireless device is obtained from one or more lists of access geolocations authorized and/or unauthorized for the mobile wireless device.

In a further implementation form of the ninth and/or tenth aspects, the expected geolocation of the mobile wireless device is estimated based on one or more previous geolocations of the mobile wireless device compared to the predefined location of the one or more wireless receivers.

In a further implementation form of the ninth and/or tenth aspects, the expected geolocation of the mobile wireless device is estimated based on one or more other geolocations of the mobile wireless device detected by one or more other wireless receivers substantially concurrently with the detection of the mobile wireless device by the one or more wireless receivers deployed at the predefined location. The one or more other wireless receivers are located at other predefined locations remote from the predefined locations of the one or more wireless receivers and have a limited reception range such that the mobile wireless device detected by the one or more wireless receivers cannot be detected by the one or more other wireless receivers.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

Figure 1:
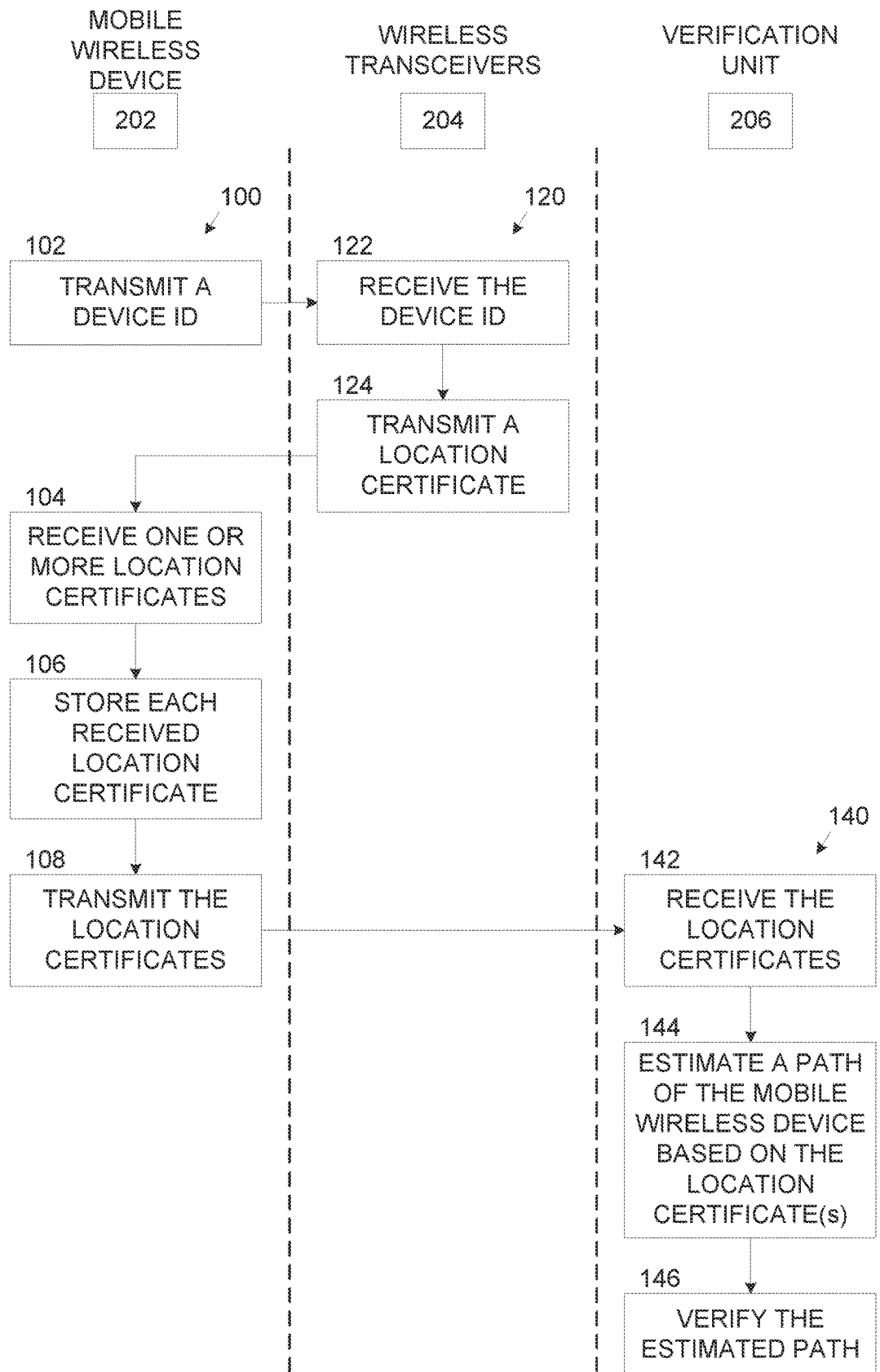
FIG. 1 is a flowchart of an exemplary process of verifying a path of a mobile wireless device in a monitored space based on wireless mapping recorded by the mobile wireless device, according to some embodiments of the present invention.

DESCRIPTION OF SPECIFIC EMBODIMENTS
OF THE INVENTION

The present invention, in some embodiments thereof, relates to verifying a path of a mobile wireless device, and, more specifically, but not exclusively, to verifying a path of a mobile wireless device in a monitored space based on wireless mapping of the mobile wireless device by wireless devices deployed in predefined locations in the monitored space.

According to some embodiments of the present invention, there are provided methods, systems, devices and computer program products for verifying a path of mobile wireless devices in monitored spaces based on wireless mapping recorded by each mobile wireless device which thus serves as the carrier of the wireless mapping.

The monitored space which may be a private area and/or a public area, for example, an office area, a building floor, a building, a facility, a school, a hospital, a sports stadium, a train station, an airport and/or the like may be deployed with one or more wireless transceivers located in predefined (fixed) locations in the monitored space. The wireless transceiver(s) may be configured to interact with other wireless devices via one or more wireless communication channels, for example, Radio Frequency (RF), Bluetooth (BT), Bluetooth Low Energy (BLE), ZigBee, Near Field Communication (NFC), Wireless Local Area Network (WLAN, e.g. Wi-Fi) and/or the like. Specifically, the wireless transceivers may be limited range transceivers having a limited transmission range, for example, 0.5 meter, 1 meter, 1.5 meter and/or the like and are thus cable of communicating only with wireless devices located within their limited transmission space (coverage area).

Optionally, one or more of the wireless transceivers may be battery-less wireless transceivers powered by energy harvested from one or more external sources using one or more energy harvesting technologies. For example, the battery-less wireless transceiver(s) may capture energy from RF transmission originating from one or more other wireless devices located in their environment, typically in their immediate environment (close proximity).

One or more mobile wireless devices present and/or moving (traveling) in the monitored space may communicate with one or more of the wireless transceivers deployed in the monitored space over one or more of the wireless communication channels. Specifically, due to the limited range of wireless transceivers, a respective mobile wireless device may communicate with a respective wireless transceiver only when the respective mobile wireless device is within the limited transmission range of the respective wireless transceiver.

Each mobile wireless device may continuously or periodically transmit a device identification (ID) uniquely assigned to the respective mobile wireless device. One or more of the wireless transceivers may intercept the device ID of the respective mobile wireless device and in response may transmit a location certificate to the respective mobile wireless device. Due to the limited range of the wireless transceivers, the respective mobile wireless device may receive the location certificate only when located within the limited transmission range of the respective wireless transceiver(s).

As such, while traveling in the monitored space one or more of the mobile wireless devices may receive and locally store one or more location certificates generated for the respective mobile wireless device(s) by wireless transceivers having their transmission space crossed (entered) by the respective mobile wireless device(s).

To this end, the mobile wireless devices and the wireless transceivers may employ one or more predefined protocols to communicate with each other, specifically to transmit and receive the location certificates.

Each location certificate may include at least the intercepted device ID of the mobile wireless device and a transceiver ID of the respective wireless transceiver which generated and transmitted the respective location certificate. However, one or more of the location certificates may further include a timestamp indicating a transmission time of the respective location certificate. While it is possible that one or more of the wireless transceiver creates the timestamps based on an internal timing reference (e.g. a clock circuit), typically the low end wireless transceivers may obtain the timing reference form the mobile wireless device itself.

Optionally, one or more of the wireless transceivers may encrypt the location certificates they transmit according to one or more cryptographic protocols and/or algorithms using one or more secret cryptographic keys which are not available and thus unknown to the mobile wireless devices.

One or more verification units having wireless connectivity via one or more of the wireless communication channels may be deployed at one or more checkpoint in the monitored space. When arriving at one of the checkpoints, a respective mobile wireless device may transmit to the respective verification unit the location certificate(s) that the respective mobile wireless device collected during its travel in the monitored space. To facilitate this communication, the mobile wireless devices and the verification units may employ one or more predefined protocols.

The verification unit may analyze the location certificate(s) received from the respective mobile wireless device to extract the device ID and the transceiver ID included in each location certificate. Optionally, in case one or more of the location certificates are encrypted, the verification unit having access to the cryptographic key(s) used by the wireless transceiver(s) may first decrypt the location certificate(s) in order to analyze it.

The verification unit may first verify that the device ID extracted from each location certificate matches the device ID of the respective mobile wireless device to ensure that the respective location certificate was indeed originally generated for the respective mobile wireless device.

The verification unit is familiar with the predefined locations of the wireless transceivers in the monitored space, specifically the location of each wireless transceiver in association with its unique transceiver ID. The verification unit may therefore map each wireless transceiver in the monitored space according to its transceiver ID.

Based on the mapping of the wireless transceivers in the monitored space, the verification unit may compute an estimated path for the respective mobile wireless device based on the wireless transceivers that the respective mobile wireless device encountered in the monitored path and are recorded by the location certificates. Moreover, using the timestamp included in one or more of the location certificates, the verification unit may compute an estimated timelined path for the respective mobile wireless device.

The verification unit may then verify the estimated path of the respective mobile wireless device, for example, by comparing the estimated path to one or more approved pats.

The path verification may be applied to one or more applications which may affect one or more aspects of the verification system and its elements, for example, the type and use of the mobile wireless devices, the deployment locations of the wireless transceivers, the transmission range of the wireless transceivers, the deployment locations of the verification units and/or the like.

In one exemplary application, the path verification may be applied to validate, authenticate and/or otherwise verify one or more users associated with respective mobile wireless devices before allowing the user(s) access one or more restricted areas and/or resources, for example, a restricted room, a restricted terminal and/or the like. In particular, the user(s) may be verified based on verification of their estimated path in the monitored space which is computed based on the wireless mapping extracted from the location certificates provided by the mobile wireless device(s) associated with the user(s) to be verified. In such exemplary applications, the wireless transceivers may be deployed at passage location typically passed by users traveling in the monitored space, for example, entrances, exits, doors, elevators, escalators, split locations (e.g., intersecting corridors, etc.) and/or the like. Moreover, the transmission range of the wireless transceivers may be set to form a wireless transmission space around each wireless transceiver that may be crossed by the users traveling in the monitored space. Furthermore, the verification unit(s) may be deployed at one or more checkpoints or access points to the restricted area(s) and/or resources, for example, at an entrance to a restricted area, next to a restricted terminal, in association with a network access point and/or the like. The verification unit(s) may verify (validate, authenticate) a certain user by comparing its estimated path to one or more approved paths. In case the estimated path complies, optionally with some acceptable deviation, with the approved path(s), the verification unit may determine that the estimated path is a valid and/or legitimate path and the associated user may be granted access to the restricted area and/or resource. However, in case the estimated path significantly deviates from the approved path(s), the verification unit may determine that the estimated path is suspicious which may be indicative that the associated user may be potentially malicious and is thus denied access to the restricted area and/or resource.

In another exemplary application, the path verification may be applied to verify a path of one or more disinfection apparatuses associated with respective mobile wireless devices compared to one or more predefined (approved) paths. The disinfection apparatuses which may be manually and/or automatically operated may apply one or more disinfection and/or sanitization technologies to disinfect one or more surfaces in the monitored space, for example, a door, a table, a floor, a wall, a door knob, a toilet seat, a sink tap and/or the like. In such exemplary applications, the mobile wireless devices may be coupled with the disinfection apparatuses, specifically with an applicator of the disinfection apparatuses, for example, a disinfection light source, a disinfection material spraying nozzle and/or the like. For example, the disinfection apparatus(s) may comprise one or more disinfection light sources configured to project disinfecting light in one or more spectral wave lengths, for example, Ultraviolet (UV), specifically, UVA, UVC and/or the like. The wireless transceivers may be therefore deployed in close spatial association with the surfaces which are the target of the disinfection process, for example, behind, in front, above, below, in close proximity and/or the like. Moreover, the transmission range of the wireless transceivers may be set according to the disinfection technology. For example, a very limited transmission range may be set in case the disinfection apparatus(s) employ a close range applicator which needs to be very close to the target surface for efficient disinfection. However, a longer transmission range may be set in case the disinfection apparatus(s) employ a wide filed applicator which may be significantly distant from the target surface and still ensure efficient disinfection. The verification unit(s) may be deployed at one or more checkpoints and/or maintenance areas where the disinfection apparatus(s) is maintained and where it may typically end the disinfection process. The verification unit(s) may verify the estimated path of the disinfection apparatus by comparing it to one or more approved paths.

Moreover, the verification unit(s) may verify one or more additional parameters of the disinfection process, for example, a projection time of the disinfecting light, for example, the UVA, the UVC and/or the like over each target surface. This may be done to ensure the projection time which is equivalent to an exposure time of the respective target surface to the disinfecting light meets one or more minimum time thresholds known in the art to be sufficient for effectively disinfecting the respective target surface. To this end the verification unit(s) may analyze the estimated path, specifically the estimated time-lined path computed for the disinfection apparatus to determine the duration of time of the light source(s) in front of each target surface which is indicative of the projection time of the disinfecting light on the respective target surface. The verification unit(s) may further compare the projection time to one or more of the time thresholds to verify that the projection time over each target surface was sufficient for effective disinfection.

Verifying the path of mobile wireless devices in a monitored space based on wireless mapping collected and carried by the mobile wireless devices may present major benefits and advantages compared to existing methods for tracking and verifying paths of mobile wireless devices.

First, some of the existing methods and systems may track the paths of the mobile wireless devices based on data collected by one or more geolocation systems and sensors, for example, Global Positioning System (GPS) and/or the like which may be highly inefficient in closed spaces. In contrast, tracking and verifying the mobile wireless devices based on their wireless mapping may be highly suitable for closed spaces having limited size where the wireless transceivers may be easily deployed to generate the wireless mapping for the mobile wireless devices.

Moreover, other existing methods and systems may track the mobile wireless devices based on their connectivity to a local wireless network, for example, a local Wi-Fi network deployed in the monitored space. However, at least some of the mobile wireless devices may not be connected to the local network or they may be connected to one or more other networks, for example, a cellular network thus making it impossible to track them according to their local network connectivity. Using the wireless transceivers on the other hand may allow efficient and constant tracking of all mobile wireless devices present and/or traveling in the monitored space.

Furthermore, due to the limited transmission range of the wireless transceivers, the wireless mapping which maps the mobile wireless devices in the monitored space may provide high resolution accurate mapping since the mobile wireless devices may collect the wireless mapping, i.e., the location certificates only when in close proximity to one or more of the wireless transceivers having a predefined and known location. As such, each location certificate may accurate place the respective mobile wireless device(s) at the specific location of the respective wireless transceiver, optionally at a specific time. This may be highly advantageous compared to existing methods which may track the mobile wireless devices based on their connectivity to the local wireless network, for example, the Wi-Fi which may be deployed using network infrastructure equipment (e.g. access points, routers, etc.) typically having a very long transmission range. Due to the long transmission range, the mobile wireless devices may communicate with the network infrastructure equipment from distant locations making it highly difficult and practically impossible to accurately map the location of the mobile wireless devices in the monitored space.

In addition, since the wireless mapping information, i.e., the location certificate(s) mapping the mobile wireless device in the monitored space is collected, stored, carried and delivered to the verification unit by the mobile device itself, there is no need to deploy communication infrastructure between the wireless transceivers and the verification unit(s) as may be done by the existing methods which may be complex, expensive and prone to faults and failures.

Also, as the wireless transceivers do not need to communicate with any distant device but rather only with the mobile wireless devices when with their limited transmission range, the wireless transceivers may be simple low cost wireless transceivers which may be also highly reliable and easily deployed in the monitored space. Using the battery-less wireless transceivers which are extremely low cost may further reduce the overall costs for deploying the path verification system and may significantly improve coverage of the monitored space by the easily and simply deployable battery-less wireless transceivers.

Lastly, since the location certificates may be encrypted and thus inaccessible to the mobile wireless devices, the mobile wireless devices may be unable to manipulate the wireless mapping in attempt to deceive the verification unit.

According to some embodiments of the present invention, there are provided methods, systems, devices and computer program products for verifying the paths of the mobile wireless devices in the monitored spaces based on the wireless mapping of the mobile wireless devices collected by limited range wireless receivers deployed in the monitored space and configured to transmit the wireless mapping to one or more of the verification units.

As described herein before, one or more of the mobile wireless devices present, moving and/or traveling in the monitored space may continuously and/or periodically transmit their unique device IDs. One or more wireless receivers may intercept the device ID(s) transmitted by the respective mobile wireless device(s). In particular, the wireless receivers may have a very limited reception range such that they may intercept only device ID(s) of mobile wireless devices located with their limited reception range.

As opposed to collecting the wireless mapping, i.e., the location certificates by the mobile wireless devices themselves, the wireless receivers may directly communicate with the verification unit(s) to provide the location certificates.

This approach for verifying the path of the mobile wireless devices based on the wireless mapping may present some benefits and advantages compared to existing methods for verifying a path based on wireless mapping.

First, as described herein before, due to the limited range of the wireless receivers, the wireless mapping extracted from the location certificates may map the mobile wireless devices in the monitored with high resolution and significantly high accuracy.

Moreover, since mobile wireless devices typically broadcast their device ID, for example, when searching for a network access point, when searching to pair a BT device and/or the like, the wireless receivers may intercept the device IDs without directly communicating with the mobile wireless devices. As such there is no need to deploy any special, predefined and/or common communication protocols between the wireless receivers and the mobile wireless devices which may significantly simplify the path verification and may make it available to practically any mobile wireless device detected in the monitored space without the need to installing such communication protocol(s) in the mobile wireless devices.

According to some embodiments of the present invention, there are provided methods, systems, devices and computer program products for authenticating one or more mobile wireless devices based on one or more wireless transceivers attached to the respective mobile wireless devices in order to verify users associated with these mobile wireless devices and grant or deny these users access to one or more secure assets based on an outcome of the authentication.

Each of the mobile wireless devices may be uniquely associated with one or more wireless transceivers which are independent (separate) from the mobile wireless device and are physically attached to the respective mobile wireless device, for example, a sticker, a label, a Nano scale device and/or the like. The association of each mobile wireless device with its attached wireless transceiver(s) may be predefined and logged in one or more listing records, for example, a list, a table, a database and/or the like which associate each of a plurality of mobile wireless devices with respective one or more wireless transceivers attached to the respective mobile wireless device.

One or more of the mobile wireless devices may be therefore authenticated by verifying that their associated wireless transceiver(s) are indeed attached to the respective mobile wireless devices.

When a user attempts to access one or more of the secure assets, for example, a restricted access area, a secure system, a secure service and/or the like, the mobile wireless device associated with the user, for example, used and/or carried may be requested to authenticate itself.

In response, the associated mobile wireless device may interact with its attached wireless transceiver(s) which may be limited range wireless transceivers having a very short transmission range defining a close proximity reception area having a small radius, for example, a radius in a range of 5-30 centimeters and/or the like. The wireless transceiver(s) may therefore operate according to one or more short range wireless technologies and/or protocols, for example, WLAN, Wi-Fi, Bluetooth, Bluetooth low energy (BLE), ZigBee, IrDA, Wireless Universal Serial Bus (USB) and/or the like. In particular, the wireless transceiver(s) may be configured to communicate according to one or more Personal Area Network (PAN) protocols which may define the short transmission range (reach) of the wireless transceiver(s), for example, a few centimeters.

As such, only when the mobile wireless device is located within the close proximity reception area, the mobile wireless device may be capable of interacting with the attached wireless transceiver(s). This means that only when the wireless transceiver(s) are actually attached to mobile wireless device, the mobile wireless device may be able to communicate with its attached wireless transceiver(s).

Moreover, the wireless transceiver(s) may typically be battery-less transceivers powered by energy harvested from the mobile wireless device using one or more energy harvesting technologies, for example, the battery-less wireless transceiver(s) may capture energy from RF transmission originating from mobile wireless device, such as, for example, cellular transmission, Wi-Fi transmission, Bluetooth transmission and/or the like.

The associated mobile wireless device may transmit its device ID to its attached wireless transceiver(s) which in response may transmit back to the mobile wireless device one or more identity certificates each comprising the device ID and the transceiver ID of the respective wireless transceiver(s) which generated the respective identity certificate.

Optionally, one or more of the identity certificates may further include a timestamp indicative of a transmission time of the respective identity certificate from the respective wireless transceiver.

Optionally, one or more of the identity certificates may further include a One Time Password (OTP) which is valid for a limited time period after which the identity certificate is invalid and hence unusable.

Optionally, one or more of the identity certificates may be encrypted according to one or more encryption protocols using one or more cryptographic keys as known in the art.

This approach for verifying the path of the mobile wireless devices based on the wireless mapping may present some benefits and advantages compared to existing methods for verifying a path based on wireless mapping.

The mobile wireless device may then transmit the identity certificate(s) to one or more verification units configured to extract the device ID and the transceiver ID(s) from the identity certificate(s) and determine whether the wireless transceiver(s) identified by its transceiver ID(s) is indeed associated with the mobile wireless device identified by its device ID. In case of positive association, i.e., the identified wireless transceiver(s) are genuinely associated with the identified mobile wireless device, the verification unit(s) may successfully authenticate the mobile wireless device while in case the of negative association, the verification unit(s) may determine an authentication failure, i.e., the mobile wireless device failed to authenticate itself.

Based on the outcome of the authentication, the user associated with the mobile wireless device may be granted or denied access to the secure asset(s).

Verifying the users by authenticating their associated mobile devices based on verifying that associated wireless transceiver(s) are attached to the associated mobile devices may present major benefits and advantages compared to existing authentication methods and systems.

First, some if not most of the existing authentication methods are based on complex applications and security measures deployed to securely store access credentials, for example, passwords, codes and/or the like. Such complex applications and security measures may be costly and may require constant maintenance, update and/or effort to securely store the access credentials, update them periodically and/or the like. This is on contrast to the wireless transceivers based authentication which involves only the use of the wireless transceivers. Such wireless transceiver, in particular very short range wireless transceivers and moreover battery-less energy harvesting wireless transceivers may be very cheap and highly available thus significantly reducing the cost of the authentication platform. Moreover, due to their very low cost, the wireless transceiver(s) which are independent of the mobile wireless device may be replaced periodically, for example, every week, every month and/or the like thus ensuring high security and robustness at significantly reduced costs. For example, a company which enforces authentication for entering a restricted office area may distribute wireless transceivers to each of its employees authorized to enter the restricted office area and may periodically replace these wireless transceivers thus significantly reducing probability of theft, loss and/or compromise of the wireless transceivers by malicious in attempt to impersonate as legitimate authorized employees.

Moreover, due to the very short transmission range of the wireless transceivers, only the mobile wireless device to which each wireless transceiver is attached may be able to communicate with the wireless transceiver and receive the identity certificate(s). Other devices even such devices which are in very close proximity to the mobile wireless device may be unable to communicate with the wireless transceiver(s) attached to the mobile wireless device and interact with the attached wireless transceiver(s) attached and/or intercept the identity certificates it transmits. This may significantly reduce the vulnerability of the wireless transceivers based authentication to potential attacks by malicious parties which may attempt to intercept the identity certificates and impersonate as legitimate mobile wireless devices.

Furthermore, using the timestamps and/or the OTP to limit the valid time of the identity certificates may further prevent replay attacks in which malicious parties may attempt to intercept identity certificates exchanged between legitimate mobile wireless devices and their attached wireless transceiver(s) and attempt to impersonate as the legitimate mobile wireless device at a later time.

In addition, encrypting one or more of the identity certificates may further increase security and robustness of the identity certificates against malicious attacks since the malicious parties may be unable to decrypt the identity certificates and extract their content and/or attempt to duplicate them.

According to some embodiments of the present invention, there are provided methods, systems, devices and computer program products for authenticating one or more mobile wireless devices based on their geolocation in order to verify users associated with these mobile wireless devices and grant or deny these users access to one or more of the secure assets based on an outcome of the authentication.

One or more malicious parties may try to pretend as legitimate users by installing, activating, transferring and/or the like one or more access application (used to access secure asset(s)) to another device in attempt to imitate a mobile wireless device associated and used by the legitimate user. For example, a common attack by hackers may be to convince a cellular operator to associate the subscription number of the legitimate (genuine) with another Subscriber Identification Module (SIM) card and/or phone which is controlled by the hacker. In other example, the hacker may install an access application and use stolen credentials of the legitimate user, for example, a password, a private key and/or the like in attempt to make the access to the secure asset(s) appear as legitimate, i.e., conducted by the legitimate user. For example, assuming a hacker gains access to email passwords and access application passwords of a certain legitimate user, the hacker may reinstall the email application and the access application on another device and using the email passwords 'approve' the transfer to the other device controlled by the hacker. The legitimate user will not get a notification of the reinstallation, for example, an email, a Short Message Service (SMS) and/or the like since the hacker gained control over the email account and/or phone number. Therefore, in order to reduce and potentially prevent such impersonation of legitimate users by malicious parties, the mobile wireless device associated with the user attempting to access the secure asset(s) may be first verified, in particular verified based on its geolocation.

When accessing the secure asset(s), the mobile wireless device associated with the user may communicate with one or more wireless receivers having limited reception range which are deployed at predefined locations. In particular, the mobile wireless device may communicate with such wireless receivers having reception coverage area defined by the limited reception range which encompasses (in range) the geolocation of the mobile wireless device. The mobile wireless device may transmit its device ID to these in range wireless receiver(s) which in turn may generate one or more location certificates comprising the device ID of the mobile wireless device and the receiver ID uniquely associated with each wireless receiver. The wireless receiver(s) may further transmit the location certificate(s) generated for the mobile wireless device to the verification unit.

The verification unit may extract the receiver ID(s) and may obtain the predefined location(s) of the wireless receiver(s) identified by the extracted receiver ID(s). The verification unit may further extract the device ID of the mobile wireless device and may verify the mobile wireless device identified by the extracted device ID based on its expected geolocation compared to the predefined location(s) of the identified wireless receiver(s).

The verification unit may verify the expected geolocation of the mobile wireless device according tone or more methods, techniques and/or operation modes. For example, the verification unit may verify the mobile wireless device by checking whether the (current) geolocation of the mobile wireless device as derived from the predefined location of the identified wireless receiver(s) is listed in one or more white lists of access geolocations authorized for the user to access the secure asset(s). In another example, the verification unit may check one or more black lists of geolocations which are not authorized for the user to access the secure asset(s). In another example, the verification unit may verify the mobile wireless device by checking whether the (current) geolocation of the mobile wireless device as derived from the predefined location of the identified wireless receiver(s) is feasible based on one or more previous geolocations recorded in one or more past times for the mobile wireless device. For example, based on analysis of the time difference between the detection of the mobile wireless device at the current geolocation and the previous geolocation(s) and further based on distance between the geolocations, the verification unit may determine whether it is possible for the mobile wireless device to be located at the previous geolocations and at the current geolocation. In another example, the verification unit may verify the mobile wireless device by checking the (current) geolocation of the mobile wireless device as derived from the predefined location of the identified wireless receiver(s) compared to one or more other geolocations in which the mobile wireless device is detected substantially concurrently.

Verifying the users by authenticating their associated mobile devices based on their geolocation may present major benefits and advantages compared to existing authentication methods and systems.

First, malicious parties launching cyber-attacks in attempt to impersonate as the mobile wireless device may typically operate from their workplace, residence and/or the like and certainly not at locations close (near) to the geolocation of the attacked mobile wireless device. Therefore, authenticating the mobile wireless device and verifying the associated user based on their geolocation at the time of accessing the secure asset(s) may significantly reduce exposure to the cyber-attacks or at least enable detection and reporting of such cyber-attacks.

For example, when a user attempts to accesses some secure assets, for example, a restricted service and/or information, the information provider via the verification unit may communicate with one or more wireless receivers, for example, network access equipment (e.g. a cellular based station, a Wi-Fi access point, etc.) of a network provider providing network service to the mobile wireless device used by the accessing user. In particular, the verification unit may communicate with the wireless receiver(s) which are located at predefined locations to check whether they 'see', i.e. in communication with the user's mobile wireless device. The verification unit may further check whether the predefined locations of the wireless receiver(s) cover (i.e., provide network coverage and connectivity) geolocation(s) approved for the user, for example, user's office, user's residence, one or more geolocation from which the user previously accessed the secure asset(s) and are thus valid and/or the like. In case the verification unit verifies that the geolocation from which the user attempts to access the secure asset (i.e., expected geolocation) is an authorized geolocation, the verification unit may indicate the information provider that the user may be granted access to the secure asset(s). However, in case the verification unit determines that the user's geolocation is not an authorized geolocation, the verification unit may indicate the information provider that the user may be a potential impersonator and should be denies access to the secure asset(s).

Therefore, in case the user attempts to access the secure asset(s) from a geolocation which is not listed in the authorized geolocations and/or from a geolocation from which the user was not previously observed and/or recorded to access the secure asset(s), the user may be denied access to the secure asset(s). For example, the user may be denied access to the secure asset(s) in case the user is identified at a Café in a city which he did not visit for a prolonged period (e.g. month) or the user is identified in a different country or the user is identified in a blacklisted geolocation (e.g., enemy state, etc.) and/or the like.

It should be noted that the information provider may not be informed of the actual geolocation of the user but rather only whether the user should be granted access or not, i.e., whether the user is one of the authorized geolocations.

Moreover, analyzing the previous and/or substantially concurrent geolocations of the mobile wireless device may indicate whether it is possible for the mobile wireless device to be located at its current geolocation. A determination, evaluation and/or estimation that it is impossible for the mobile wireless device to travel between these geolocations within the time indicated for these geolocations may be highly indicative of a potential malicious cyber-attack initiated in attempt to impersonate as the mobile wireless device.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of verifying a path of a mobile wireless device in a monitored space based on wireless mapping recorded by the mobile wireless device, according to some embodiments of the present invention.

An exemplary process 100 may be executed by a mobile wireless 202 device traveling in a monitored space to collect wireless mapping information from one or more wireless transceivers 204 deployed in the monitored space which the mobile wireless device passes and communicates with. A complementary exemplary process 120 may be executed by each wireless transceiver 204 interacting with the mobile wireless device.

At one or more checkpoints in the monitored space, the mobile wireless device may provide the wireless mapping information to a respective verification unit 206 which may execute an exemplary process 140 to estimate a path of the mobile wireless device 202 in the monitored space based on the wireless mapping information in order to authenticate, validate and/or authorize a user and/or an apparatus associated with the mobile wireless device 202.

Figure 2:
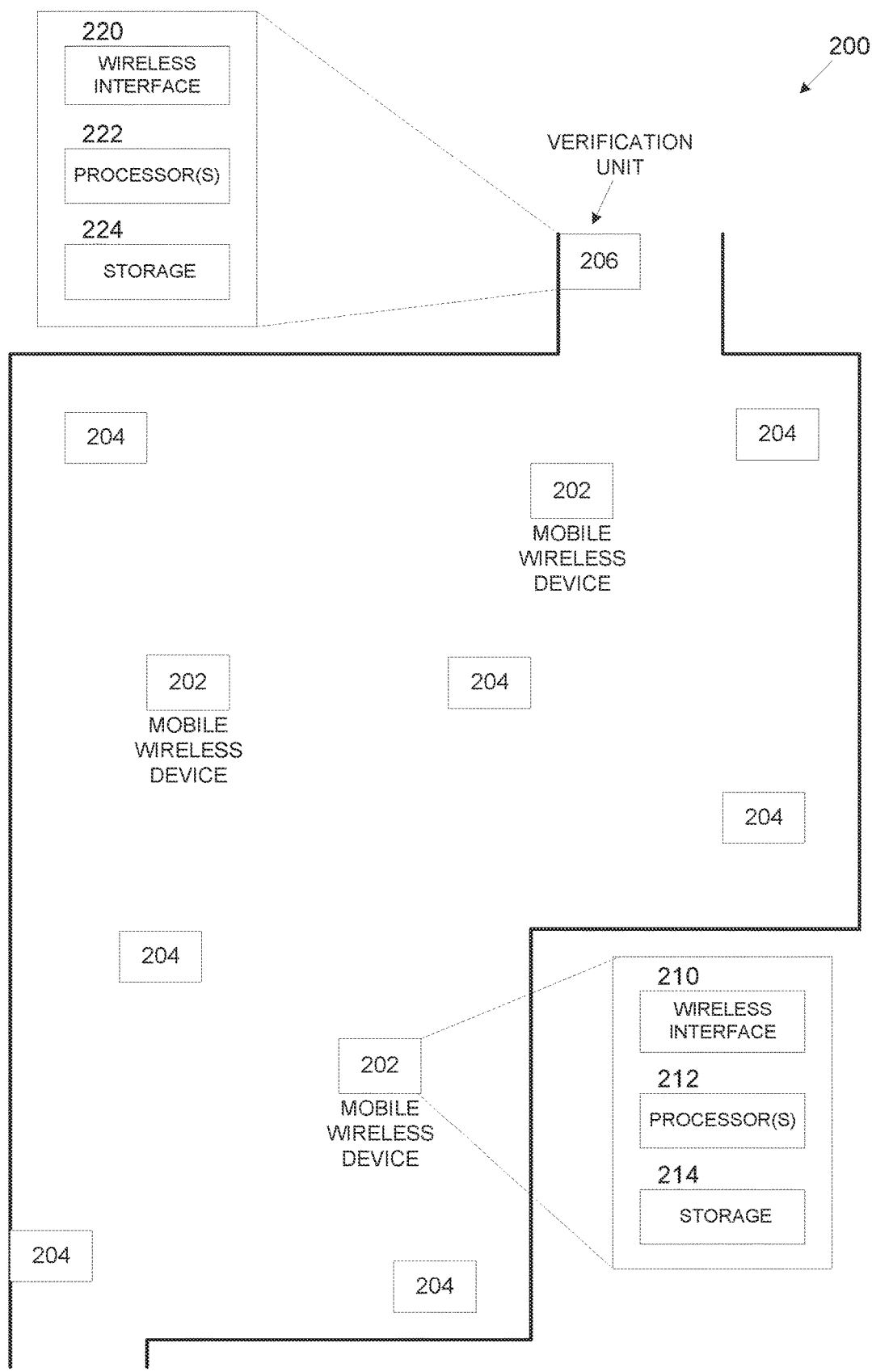
FIG. 2 is a schematic illustration of an exemplary system for verifying a path of a mobile wireless device in a monitored space based on wireless mapping, according to some embodiments of the present invention.

Reference is also made to FIG. 2, which is a schematic illustration of an exemplary system for verifying a path of a mobile wireless device in a monitored space based on wireless mapping, according to some embodiments of the present invention.

An exemplary monitored space 200 which may be a private area and/or a public area, for example, an office area, a building floor, a building, a facility, a school, a hospital, a sports stadium, a train station, an airport and/or the like may be deployed with one or more wireless transceivers 204. The wireless transceivers 204 may operate according to one or more wireless technologies and/or protocols, for example, Radio Frequency (RF), Bluetooth (BT), Bluetooth Low Energy (BLE), ZigBee, Near Field Communication (NFC), Wireless Local Area Network (WLAN, e.g. Wi-Fi) and/or the like.

Each of the wireless transceivers 204 may be deployed at a respective predefined and known static (fixed) location in the monitored space 200, specifically the wireless transceivers 204 may be deployed to provide sufficient coverage of the monitored space 200.

Moreover, the wireless transceivers 204 deployed in the monitored space 200 may be limited range transceivers having a limited transmission range, for example, 0.5 meter, 1 meter, 1.5 meters, 2 meters and/or the like. This means that each of the wireless transceivers 204 may have a very limited transmission space (area), typically a limited radius transmission sphere around the respective wireless transceiver 204 where the radius equals the transmission range. Therefore, only wireless receivers located within the limited transmission range of a respective wireless transceiver 204 may be able to intercept data transmission originating (transmitted by) from the respective wireless transceiver 204.

Optionally, one or more of the wireless transceivers 204 are battery-less wireless transceivers powered by energy harvested from one or more external sources using one or more energy harvesting technologies. Specifically, the wireless transceiver(s) 204 may capture energy from Radio Frequency (RF) transmission originating from one or more other wireless devices. Such battery-less wireless transceivers may be extremely simple and very low cost and may be therefore available in easy deployment forms, for example, a sticker, a label and/or the like which may be highly suitable for wide spread deployment in the monitored space 200.

One or more mobile wireless devices 202 may move and/or be present in a monitored space 200 which may be a private area and/or a public area, for example, an office area, a building floor, a building, a facility, a school, a hospital, a sports stadium, a train station, an airport and/or the like. As such, while moving through the monitored space 200, one or more of the mobile wireless devices 202 may communicate with one or more of the wireless transceivers 204 deployed in the monitored space 200, specifically to collect wireless mapping of the mobile wireless devices 202 in the monitored space 200. In particular, due to the limited transmission range of the wireless transceivers 204, the mobile wireless device 202 may communicate with a respective wireless transceiver 204 only when entering the limited transmission range (area, sphere) of the respective wireless transceiver 204.

According to some embodiments of the present invention, each mobile wireless device 202 may be associated with a respective user traveling in the monitored space and as such may include, for example, a Smartphone, a Smartwatch, a wearable wireless device (e.g. bracelet, tag, card, etc.) and/or the like. Each mobile wireless device 202 associated with a respective associated user may be therefore carried, worn, attached and/or otherwise physically coupled with the respective user such that each mobile wireless device 202 moves together with its respective user in the monitored space 200.

According to other embodiments of the present invention, each mobile wireless device 202 may be associated with a respective disinfection apparatus configured to disinfect one or more surfaces in the monitored space 200, for example, a door, a table, a floor, a wall, a door knob, a toilet seat, a sink tap and/or the like. The disinfection apparatus which may be a manually operated apparatus, and/or an automatic apparatus may apply one or more disinfection and/or sanitization technologies to disinfect the surfaces. For example, the disinfection apparatus may comprise one or more light sources (applicators) which may be operated to project disinfection light on the surface(s) in one or more spectral wave lengths, for example, UV, specifically, UVA, UVC and/or the like. The light source(s) of the disinfection apparatus may be further operated to project the disinfection light according to one or more patterns, for example, a beam width (e.g. wide, narrow, surface distance dependent, etc.), a timing (e.g. continuously, periodically, per instruction, etc.) and/or the like. In another example, the disinfection apparatus may comprise one or more spraying nozzles (applicators) which may be operated to spray one or more disinfection materials on the surface(s). Each mobile wireless device 202 associated with a respective disinfection apparatus may be therefore installed, mounted, attached and/or otherwise physically coupled with the respective disinfection apparatus such that each mobile wireless device 202 moves together with its respective disinfection apparatus in the monitored space 200. Moreover, the mobile wireless device 202 associated with the respective disinfection apparatus may be physically coupled with a disinfection element of the respective disinfection apparatus, for example, the light source(s), the spraying nozzle(s) and/or the like.

Each mobile wireless device 202 may comprise a wireless interface 210, a processor(s) 212 and a storage 214 for storing code (program store) and/or data.

The wireless interface 210 may include one or more wireless interfaces, for example, RF, BT, BLE, ZigBee, NFC, WLAN and/or the like for communicating with one or more other wireless devices. The wireless interface 210 may further include one or more long range wireless interfaces, for example, a WLAN interface a cellular interface and/or the like for connecting to respective networks.

The processor(s) 212, homogenous or heterogeneous, may include one or more processing nodes arranged for parallel processing, as clusters and/or as one or more multi core processor(s). The processor(s) 212 may execute one or more software modules such as, for example, a process, a script, an application, an agent, a utility, a tool, an Operating System (OS), a driver, a plug-in, a patch, an update and/or the like each comprising a plurality of program instructions stored in a non-transitory medium (program store) such as the storage 214 and executed by one or more processors such as the processor(s) 212. The processor(s) 212 may further integrate, utilize and/or facilitate one or more hardware modules (elements) integrated and/or coupled with the mobile wireless devices 202, for example, a circuit, a component, an Integrated Circuit (IC), an Application Specific Integrated Circuit (ASIC), a Field Programmable Gate Array (FPGA), a Digital Signals Processor (DSP) and/or the like.

The processor(s) 212 may therefore execute one or more functional modules utilized by one or more software modules, one or more of the hardware modules and/or a combination thereof for executing the process 100.

In the embodiments relating to the mobile wireless devices 202 associated with users, the wireless transceivers 204 may be deployed and located in the monitored space 200 to provide sufficient coverage for most and desirably all travel paths possible in the monitored space 200. The wireless transceivers 204 may be therefore deployed to cover possible travel paths of users in the monitored space 200, for example, corridors, halls, room and/or the like, specifically such that the users may cross the limited radius transmission sphere around one or more of the wireless transceivers 204. As such, the wireless transceiver 204 may be deployed at passage locations where users may typical pass while traveling in the monitored space 200, for example, entrances, exits, doors, elevators, escalators, split locations (e.g., intersecting corridors, etc.) and/or the like. While deployed to cover the paths in the monitored space 200, the deployment locations of the wireless transceivers 204 may further depend on the wireless technology and range of the selected wireless transceivers 204.

In the embodiments relating to the mobile wireless devices 202 associated with disinfection apparatuses, the wireless transceivers 204 may be deployed and located in association with the surfaces requiring which are the target of the disinfection procedure executed by one or more of the disinfection apparatuses. As such, the wireless transceivers 204 may be associated with respect to each surface in one or more locations, for example, on, behind, in front, above, below, in close proximity and/or the like. Again, while deployed to provide coverage of the surfaces in the monitored space 200 which are the target of the disinfection procedure, the deployment locations of the wireless transceivers 204 may further depend on the wireless technology and range of the selected wireless transceivers 204 which may optionally depend of the disinfection and/or sanitization technology employed by the disinfection apparatus(s) to disinfect the surface(s). For example, in case the disinfection apparatus employs a close proximity disinfection technology requiring the applicator (e.g. light source and/or the nozzle) to be in very close proximity to the target surface in order to effectively disinfect it, for example, 0.2 meter, 0.5 meter, 1 meter and/or the like, the mobile wireless device 202 may be associated (mounted, integrated, etc.) with the applicator and the wireless transceivers 204 may be configured to have a very limited transmission range which may overlap with the close proximity applicator. However, in case the disinfection apparatus employs a wide filed disinfection technology in which the applicator may be significantly distant from the target surface and still effectively disinfect it, for example, 2 meters, 3 meters and/or the like, the mobile wireless device 202 may be associated with the applicator and the wireless transceivers 204 may be configured to have a relatively large transmission range which may overlap with the wide field applicator.

Furthermore, one or more verification units 206 may be deployed in the monitored space 200 to communicate with the mobile wireless device(s) 202, receive its verify a path of one or more of the mobile wireless devices 202 in the monitored space 200.

The verification units 206 may be deployed at various locations in the monitored space 200 or offsite optionally depending on the verification application. For example, in embodiments relating to the mobile wireless devices 202 associated with users which need to be validated before allowed to access one or more restricted areas and/or resources, for example, a restricted room, a restricted terminal and/or the like, the verification unit(s) 206 may be deployed at one or more of checkpoints or access points to the restricted area(s) and/or resources. In another example, in embodiments relating to the mobile wireless devices 202 associated with users which need to be validated before allowed to access one or more restricted resources, for example, a restricted (secure, protected, etc.) network and/or the like, the verification units 206 may be deployed next and/or in association with one or more network infrastructure equipment, for example, an access point, a router, a switch and/or the like. In another example, in the embodiments relating to the mobile wireless devices 202 associated with disinfection apparatuses, the verification units 206 may be deployed and located at one or more maintenance locations where the disinfection apparatuses are maintained which may be their final stop after completing the disinfection procedure.

Each verification unit 206 may therefore comprise a wireless interface 220 such as the wireless interface 210 for communicating with one or more other wireless devices, a processor(s) 222 such as the processor(s) 212 for executing a verification process to verify the path of the mobile wireless device(s) 220 and a storage 224 such as the storage 214 for storing code (program store) and/or data. The verification unit 206 may execute one or more functional modules to execute the verification process executed which may be utilized by one or more software modules, one or more of the hardware modules and/or a combination thereof.

Optionally, the verification unit(s) 206, may be remote systems which are located on site and/or offsite (e.g. remote server, cloud service, cloud platform, etc.) and are adapted to communicate with the mobile wireless device(s) 202 via one or more on-spot access devices deployed at one or more of the checkpoints, network infrastructure equipment and/or maintenance locations. Moreover, in order to ensure data security, integrity and/or privacy, the communication between the verification unit(s) 206 and the on-spot access device(s) may be secure, for example, encrypted, interception proof and/or the like.

The process 100 may be executed by one or more of the mobile wireless devices 202 moving in any monitored space 200 deployed with one or more of the wireless transceivers 204. As such, the process 100 may be executed by mobile wireless devices 202 associated with users traveling in the monitored space 200 and/or by mobile wireless devices 202 associated with disinfection apparatuses maneuvered, manually and/or automatically to disinfect surfaces in the monitored space 200.

The mobile wireless device 202 may execute the process 100 by executing one or more functional modules, for example, an application stored in the mobile wireless device 202, for example, in the storage 214 and executed by the processor(s) 212. Similarly, each verification unit 206 may execute the process 140 by executing one or more functional modules, for example, an application stored in the verification unit 206, for example, in the storage 224 and executed by the processor(s) 222. Each wireless transceiver 204 may also execute one or more functional modules utilized by one or more software modules executed by a processing circuit of the respective wireless transceiver 204, one or more hardware modules of the respective wireless transceiver 204 and/or a combination thereof.

The mobile wireless device(s) 202, the wireless transceiver(s) 204 and the verification unit(s) 206 may follow one or more common communication and interaction protocols deployed over one or more predefined communication channels to exchange data between them.

As shown at 102, while moving through the monitored space 200, the mobile wireless device 202 may transmit its device identification (ID) via one or more of the wireless channels supported by the wireless interface 210, for example, BT, BLE, ZigBee, WLAN and/or the like. Specifically, the mobile wireless device 202 may transmit its device ID via one or more wireless channels defined by the common communication and interaction protocols employed for communication between the mobile wireless devices 202 and the wireless transceivers 204.

The device ID transmitted by each mobile wireless device 202 may be uniquely associated with the respective mobile wireless device 202 such that each mobile wireless device 202 may be identified according to its associated unique device ID. The device ID may be based on and/or include, for example, a serial number of the mobile wireless device 202, a network Media Access Controller (MAC) address and/or the like.

The mobile wireless device 202 may transmit its device ID according to one or more protocols either standard and/or proprietary which may define one or more transmission parameters for the transmission of the device ID by the mobile wireless device 202. For example, the transmission parameters may define a transmission mode of the device ID, for example, periodic transmission, continuous transmission and/or the like. For the periodic transmission, the transmission parameters may further define a time period between subsequent transmission, for example, 1 second, 2 seconds, 5 seconds and/or the like. In another example, the transmission parameters may define a transmission signal strength, for example, high signal strength, standard signal strength, low signal strength and/or the like in order to define and/or limit the transmission range of the device ID with respect to the location of the mobile wireless device 202.

As shown at 122, one or more wireless transceivers 204 configured to intercept data transmitted over the wireless channel(s), specifically wireless transceiver(s) 204 which are within the transmission range of the mobile wireless device 202, may receive the device ID transmitted from the mobile wireless device 202.

As shown at 124, each wireless transceiver 204 which receives the device ID may transmit in response a location certificate intended for the mobile wireless device 202.

The location certificate may include at least the device ID of the mobile wireless device 202 and a transceiver ID uniquely associated with the respective wireless transceiver 204. The unique transceiver ID assigned to each of the wireless transceivers 204 may be allocated using one or more methods as described for the mobile wireless device 202.

However, the location certificate transmitted by one or more of the wireless transceivers 204 may further include a timestamp indicative of a transmission time of the location certificate from the respective wireless transceiver 204. The wireless transceiver 204 may generate the timestamp based on one or more timing mechanisms. Typically, the wireless transceiver 204 may compute the timestamp based on a timing reference received from the mobile wireless device 202. However, in another example, one or more of the wireless transceivers 204 may compute the timestamp based on one or more internal timing, clock and/or counter circuits. Moreover, one or more of the internal counter circuits may be synchronized according to timing signals, for example, a beacon, a sync and/or the like transmitted periodically by one or more wireless transmitters and intercepted by the wireless transceiver(s) 204.

Optionally, one or more of the wireless transceivers 204 may encrypt the location certificate according to one or more encryption protocols using one or more cryptographic keys which are available to the respective wireless transceiver 204 and known to the verification unit(s) 206. It should be noted, that the mobile wireless device 202 may be unable to decrypt encrypted location certificates since it does not have access to the cryptographic key(s) used by the wireless transceiver(s) 204.

As shown at 104, the mobile wireless device 202 may receive the location certificate(s) transmitted by the wireless transceiver(s) 204 in response to the reception of the device ID transmitted by the mobile wireless device 202.

Since the wireless transceivers 204 have a very limited transmission range, the mobile wireless device 202 may receive location certificate(s) only from wireless transceiver(s) 204 which is in close proximity to the mobile wireless device 202 such that the mobile wireless device 202 is located in the limited transmission range of this close proximity wireless transceiver(s) 204.

As such while traveling through the monitored space 200, the mobile wireless device 202 may collect location certificates from one or more of the wireless transceivers 204 deployed in the monitored space 200 which have limited transmission area crossed by the mobile wireless device 202. Moreover, the mobile wireless device 202 may move back and forth, meaning that it may move back to an area in monitored space 200 in which the mobile wireless device 202 was already before. In such case, the mobile wireless device 202 may exit and re-enter the limited transmission range (area) of one or more of the wireless transceivers 204 deployed in the previously visited area and may thus interact again with this wireless transceiver(s) 204. The less transceiver(s) 204 may therefore receive again the device ID of the mobile wireless device 202 and may transmit one or more additional location certificates to the mobile wireless device 202. The location certificates collected by the mobile wireless device 202 may be therefore highly indicative of the path of the mobile wireless device 202 in the monitored space 200.

As shown at 106, the mobile wireless device 202 may store the location certificate(s) received form the wireless transceiver(s) 204 in its local storage, for example, the storage 214.

As shown at 108, at one or more checkpoints, the mobile wireless device 202 may transmit its stored location certificate(s) to a respective verification unit 206 deployed to monitor the respective checkpoint.

As shown at 142, the verification unit 206 deployed at one or more of the checkpoints in the monitored space may receive the location certificate(s) from the mobile wireless device 202 which arrived to the respective checkpoint.

Optionally, in case one or more of the received location certificates are encrypted, the verification unit 206 having access to the cryptographic key(s) used to encrypt the location certificate(s) may use this cryptographic key(s) to decrypt the encrypted location certificate(s).

As shown at 144, the verification unit 206 may estimate the path travelled by the mobile wireless device 202 in the monitored space 200 up to the respective checkpoint.

The verification unit 206 may first analyze each received location certificate to extract the device ID of the mobile wireless device 202 and the transceiver ID of the respective wireless transceiver 204 which generated the respective location certificate. The verification unit 206 may compare between the device ID extracted from each location certificate and the device ID of the mobile wireless device 202 to ensure that the location certificate received from the mobile wireless device 202 was indeed generated for the specific mobile wireless device 202.

The predefined location of the each of the wireless transceivers 204 deployed in the monitored space 200 may be available to the verification unit 206, specifically in association with their transceiver IDs. For example, the verification unit 206 may locally store one or more records, for example, a table, a list, a database and/or the like associating the predefined location each wireless transceiver 204 with its unique transceiver ID. In another example, the verification unit 206 may communicate with one or more remote networked resources, for example, a storage server, a cloud storage service and/or the like which store the predefined location of the wireless transceivers 204 in association with their transceiver IDs to obtain the predefined location the wireless transceiver(s) 204 whose transceiver ID is extracted from the received location certificate(s).

Based on the predefined location of each wireless transceiver 204, the verification unit 206 may estimate the path of the mobile wireless device 202 in the monitored space 200.

Moreover, using the timestamp included in one or more of the location certificates created for the mobile wireless device 202, the verification unit may timeline the estimated path and map it in time to generate a more accurate timelined estimated path expressed both spatially in the monitored space 200 and temporally over time.

A shown at 146, the verification unit 206 may verify the estimated path of the mobile wireless device 202. In particular, the verification unit 206 may verify the estimated path with respect to one or more approved paths comparing between the estimated path and each of the approved path(s). In case of a match between the estimated path and one of the approved path(s), the verification unit 206 may determine that the estimated path is valid and legitimate. However, in case the estimated path does not match any of the approved path(s), the verification unit 206 may determine that the estimated path is suspicious and potentially illegitimate and/or at least partially non-complaint with the approved path(s).

For example, assuming the verification unit 206 is deployed and configured to verify, authenticate and/or validate a user associated with the mobile wireless device 202 in order to grant/deny the associated user access to a restricted area and/or a restricted resource. Specifically, the verification unit 206 may verify the associated user by comparing the estimated path with one or more paths approved for users in the monitored space 200. In case the estimated path of the associated user matches one of the approved path(s), the verification unit 206 may determine that the associated user is a legitimate user and may grant him access to the restricted area and/or resource. However, in case the estimated path of the associated user does not match any of the approved path(s), the verification unit 206 may determine that the associated user is potentially not a legitimate user and may deny him access to the restricted area and/or resource.

In another example, assuming the verification unit 206 is deployed and configured to verify the path of a disinfection apparatus associated with the mobile wireless device 202 in order to verify that the associated disinfection apparatus is operated to disinfect one or more of the surfaces in the monitored space 200 according to a predefined (approved) path. In case the estimated path of the associated disinfection apparatus matches the predefined approved path, the verification unit 206 may determine that the associated disinfection apparatus successfully disinfected the surfaces defined by the predefined approved path. However, in case the estimated path of the associated disinfection apparatus does not match the predefined path, the verification unit 206 may determine that the associated disinfection apparatus failed to effectively disinfect at least some of the surfaces defined by the predefined approved path and/or part thereof.

As part of the path verification, the verification unit 206 may further verify one or more additional parameters of the disinfection process conducted by the disinfection apparatus. For example, the verification unit 206 may verify a projection time of the disinfecting light, for example, the UVA, the UVC and/or the like over each target surface in order to ensure that the projection time complies with one or more minimum time thresholds. The projection time which is naturally equivalent to an exposure time of the respective target surface to the disinfecting light must be sufficient as known in the art for effectively disinfecting the respective target surface. The verification unit 206 may therefore analyze the estimated path, specifically the estimated time-lined path computed for the disinfection apparatus to determine the duration of time of the light source(s) in front of each target surface which is indicative of the projection time of the disinfecting light on the respective target surface. The verification unit 206 may than compare the projection time to one or more of the time thresholds to verify that the exposure time of each target surface to the disinfecting light is sufficient for effective disinfection.

The verification unit 206 may apply several techniques for analyzing the estimated time-lined path computed for the disinfection apparatus. For example, one or more of the wireless transceivers 204 associated with one or more of the target surfaces may generate and transmit to the disinfection apparatus multiple location certificates during the time that the disinfection apparatus is located within the transmission range of the respective wireless transceiver 204. The wireless transceiver(s) 204 may periodically transmit such repetitive location certificates, for example, every 0.5 second, every second, and/or the like. Assuming that the location certificates include timestamps, the estimated time-lined path computed for the disinfection apparatus based on the location certificates may therefore reflect the duration of time that the disinfection apparatus was within the transmission range of the respective wireless transceiver 204 which is indicative of the projection time of the disinfecting light over the respective target surface associated with the respective wireless transceiver 204. The verification unit 206 may therefore compare the exposure time over one or more of the target surfaces as derived from the estimated time-lined path to one or more of the time thresholds to verify that the exposure time of each target surface to the disinfecting light is sufficient for effective disinfection. In another example, assuming multiple wireless transceivers 204 are deployed along a certain target surface, specifically such that the transmission ranges of these wireless transceivers 204 do not overlap. While the disinfection apparatus moves to disinfect the certain target surface it may communicate with the wireless transceivers 204 deployed along the certain target surface to collect respective location certificates which may include timestamps. The estimated time-lined path computed for the disinfection apparatus based on the location certificates may therefore reflect the time at which the disinfection apparatus reached each of the wireless transceivers 204. Analyzing the estimated time-lined path, the verification unit 206 may compute the speed of the disinfection apparatus while moving with respect to the certain target surface. The verification nit 206 may further drive from the speed a projection time of the disinfecting light over each segment of the certain target surface. The verification unit 206 may then compare the projection time over each segment to one or more of the time thresholds to verify that the exposure time of each segment of the certain target surface to the disinfecting light is sufficient for effective disinfection.

The verification unit 206 may further analyze the estimated path with respect to a layout of the monitored space 200, for example, a geometry, a map of entry/exit points, corridors, rooms, halls, elevators, escalators and/or the like.

Moreover, based on the analysis of the estimated path, specifically the time-lined estimated path with respect to the layout of the monitored space, the verification unit 206 may further estimate a movement speed of the mobile wireless device 202 in the monitored space 200 which may be further used to verify the estimated path.

Figure 3:
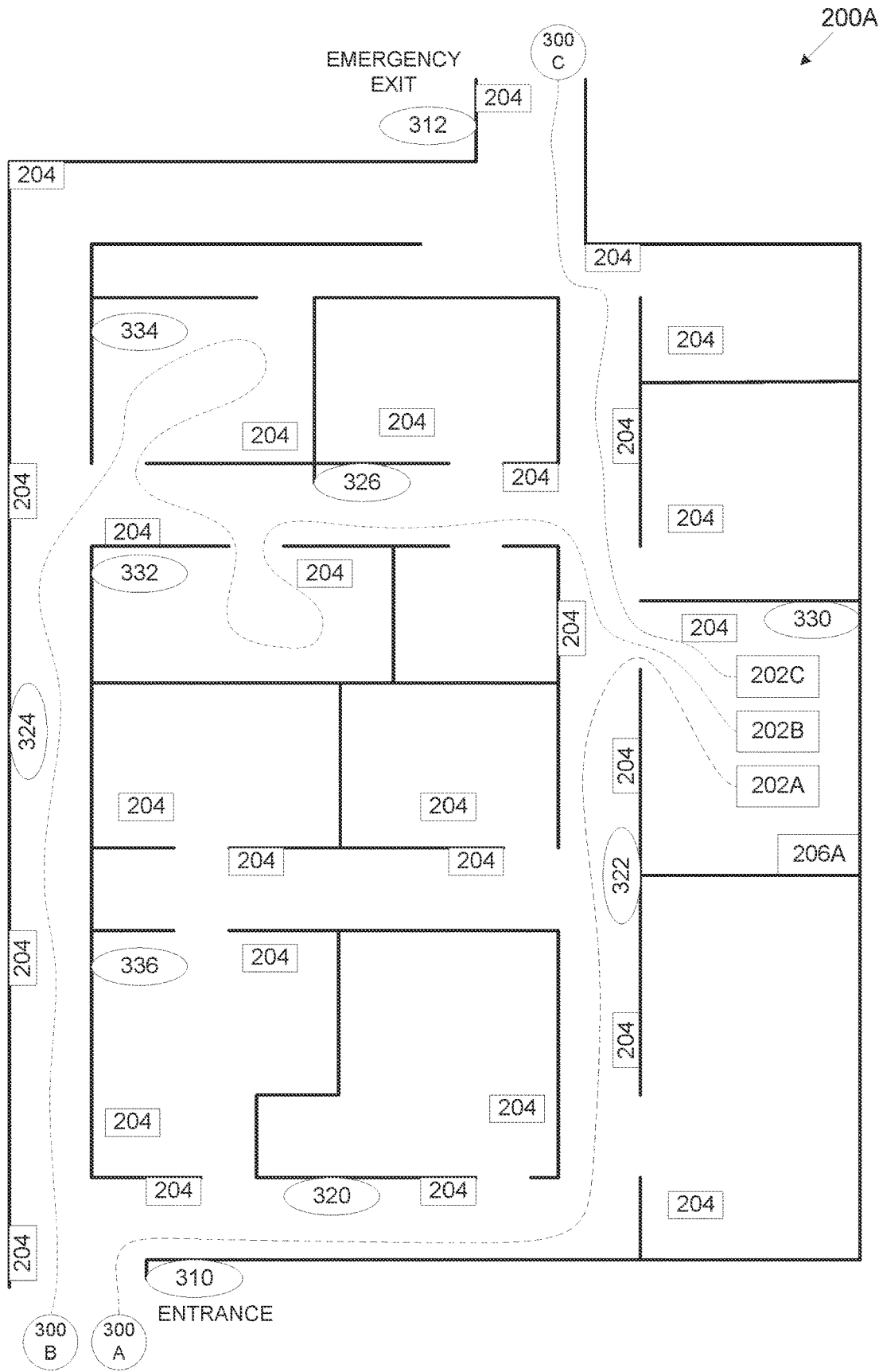
FIG. 3 is a schematic illustration of exemplary travel paths of mobile wireless devices evaluated for path verification in a first exemplary monitored space, according to some embodiments of the present invention.

Reference is now made to FIG. 3, which is a schematic illustration of exemplary travel paths of mobile wireless devices evaluated for path verification in a first exemplary monitored space, according to some embodiments of the present invention.

An exemplary monitored space 200A, for example, an offices site such as the monitored space 200 may comprise a plurality of rooms, for example, an office, a cafeteria, toilets, a conference room, a hall, a library, a copy room and/or the like accessible form one or more of a plurality of corridors. The monitored offices site 200A may be entered from a single entrance 310 and from an emergency exit 312 which is typically closed.

A plurality of wireless transceivers such as the wireless transceiver 204 may be deployed at various locations in the monitored offices site 200A, specifically at passage locations where users may typical pass while traveling in the monitored offices site 200A, for example, at the entrance 310, at the emergency exit 312, in one or more of the corridors, in one or more of the rooms and/or the like. Moreover, the wireless transceivers 204 may be deployed at locations which are typically passed by traveling users, for example, room doors, corridor corners and/or the like. As such, the wireless transceivers 204 may be deployed to effectively cover the monitored offices site 200A, in particular the travel paths in the monitored offices site 200A.

A verification unit 206A such as verification unit 206 may be deployed in the office 330 to validate, authenticate and/or otherwise verify users attempting to access (connect to) a certain restricted resource, for example, a network of the monitored offices site 200A via an access point located in the office 330. In order to verify that one or more users attempting to connect to the access point in office 330 are allowed to do so, the verification unit 206A may verify the path travelled by the user to the office 330.

A first user associated with a first mobile wireless device 202A may travel to a certain room 330, for example, an office in a first path 300A, a second user associated with a second mobile wireless device 202B may travel to the office 330 in a second path 300B and a third user associated with a third mobile wireless device 202C may travel to the office 330 in a third path 300C.

As seen, the path 300A starts from the entrance 310 and goes through corridors 320 and 322 to the office 330. The mobile wireless device 202A may therefore communicate with one or more of the wireless transceivers 204 located along the path 300A to collect respective location certificates, for example, the wireless transceiver 204 deployed at the entrance 310, one or more of the wireless transceivers 204 deployed in the corridors 320 and/or 322 and/or the wireless transceiver 204 deployed in the office 330. The path 300B also starts from the entrance 310 and goes through corridor 324 to room 334, out of the room 334 to room 332, out of the room 332 and through corridor 326 to the office 330. The mobile wireless device 202B may therefore communicate with one or more of the wireless transceivers 204 located along the path 300B to collect respective location certificates, for example, the wireless transceiver 204 deployed at the entrance 310, one or more of the wireless transceivers 204 deployed in the corridor 324, one or more of the wireless transceivers 204 deployed in the rooms 332 and/or 334, one or more of the wireless transceivers 204 deployed in the corridor 326 and/or the wireless transceiver 204 deployed in the office 330. The path 300C starts from the emergency exit 312 and goes through corridor 322 to the office 330. The mobile wireless device 202C may therefore communicate with one or more of the wireless transceivers 204 located along the path 300C to collect respective location certificates, for example, the wireless transceiver 204 deployed at emergency exit 312, one or more of the wireless transceivers 204 deployed in the corridor 322 and/or the wireless transceiver 204 deployed in the office 330.

Assuming that after arriving to the office 330, each of the three users may attempt to access the access point located in the office 330 in order to connect to the network of the monitored offices site 200A. The verification unit 206A may therefore validate and/or authenticate the respective users based on verification of the verify the paths 300A, 300B and 300C respectively and accordingly grant or deny the respective user access to the network.

For example, the verification unit 206A may receive the location certificates collected by the mobile wireless device 202A along the path 300A and may extract the transceiver IDs of the respective wireless transceivers 204 that the mobile wireless device 202A passed and interacted with along the path 300A. The verification unit 206A may then compute an estimated path 300A according to the predefined locations of the respective wireless transceivers 204. As described herein before, the verification unit 206A may further use the timestamp included in one or more of the location certificates to compute a time-lined estimated path 300A. The verification unit 206A may compare the estimated path 300A to one or more approved paths leading to the office 300, in particular an approved path which is a straight route from the entrance 310 to the office 330 and may determine that the estimated path 300A is a valid path. Based on this determination the verification unit 206A may verify the user associated with the mobile wireless device 202A and may grant him access to the access point located in the office 330 to connect to the network.

In another example, the verification unit 206A may receive the location certificates collected by the mobile wireless device 202B along the path 300B and may extract the transceiver IDs of the respective wireless transceivers 204 that the mobile wireless device 202B passed and interacted with along the path 300B. The verification unit 206A may then compute an estimated path 300B optionally a time-lined estimated path 300B according to the predefined locations of the respective wireless transceivers 204. The verification unit 206A may than compare the estimated path 300B to one or more of the approved paths leading to the office 330 and may determine that the estimated path 300B is highly suspicious as it does not follow a direct route to the office 330 but rather goes through the rooms 334 and 332 before finally arriving to the office 330. The suspicious estimated path 300B may be indicative of an unauthorized user sneaking though the monitored offices site 200A in attempt to locate an access point for connecting to the network for one or more potentially malicious goals. Based on this determination the verification unit 206A may deny the user associated with the mobile wireless device 202B access to the access point located in the office 330 to prevent him from connecting to the network.

In another example, the verification unit 206A may receive the location certificates collected by the mobile wireless device 202C along the path 300C and may extract the transceiver IDs of the respective wireless transceivers 204 that the mobile wireless device 202C passed and interacted with along the path 300C. The verification unit 206A may then compute the estimated path 300C optionally a time-lined estimated path 300C according to the predefined locations of the respective wireless transceivers 204. The verification unit 206A may than compare the estimated path 300C to one or more of the approved paths leading to the office 330 and may determine that the estimated path 300C is highly suspicious since it starts from the emergency exit 312 which is not typically used for entering the monitored office site 200A. The suspicious estimated path 300C may be also indicative of an unauthorized user sneaking though the emergency exit 312 into the monitored offices site 200A in attempt to locate an access point for connecting to the network for one or more potentially malicious goals. Based on this determination the verification unit 206A may deny the user associated with the mobile wireless device 202B access to the access point located in the office 330 to prevent him from connecting to the network.

Optionally, the verification unit 206 analyzes the estimated path with respect to one or more of the approved path(s) according to one or more deviation patterns.

For example, assuming the path verification is applied to verify users associated with mobile wireless devices 202 based on their path in the monitored space 200, for example, the monitored office site 200A. One or more deviation patterns may be defined to indicate that a user heading for the office 330 may deviate from the straight approved path leading to the office 330, for example, to room 336 which may be, for example, the toilets or a cafeteria or some other public space. The deviation pattern(s) may further define a minimum and/or maximum time periods that a deviating user is allowed to stay in the room 336. Therefore, in case verification unit 206A determines that the estimated path of one or more of the users, for example, the estimated path 300A computed for the user associated with the mobile wireless device 202A goes through the room 336 and optionally does not exceed the minimum and/or maximum allowed time periods, the verification unit 206A may still positively verify this user and may grant him access to the access point located in the office 330 for connecting to the network.

In another example, assuming the path verification is applied to verify the path of a disinfection apparatus. One or more deviation patterns may be defined to indicate that a disinfection apparatus operated to disinfect three different surfaces in the monitored space 200 may do so in one or more orders which may affect their path through the monitored space 200.

For example, the deviation pattern(s) may define a first approved path of a certain disinfection apparatus may start from a first surface going to a second surface and finishing with a third surface before going to a maintenance point serving as a checkpoint where a certain verification unit 206 may verify the path of the certain disinfection apparatus. However, the deviation pattern(s) may also define a second approved path for the certain disinfection apparatus which may start from the third surface going to the first surface and finishing with the second surface before going to the maintenance point where the verification unit 206 may verify the path of the certain disinfection apparatus.

According to some embodiments of the present invention, the path verification process may be conducted base on location certificates collected by one or more verification units 206 directly from one or more wireless devices, specifically, one or more wireless receivers deployed in the monitored space 200.

Figure 4:
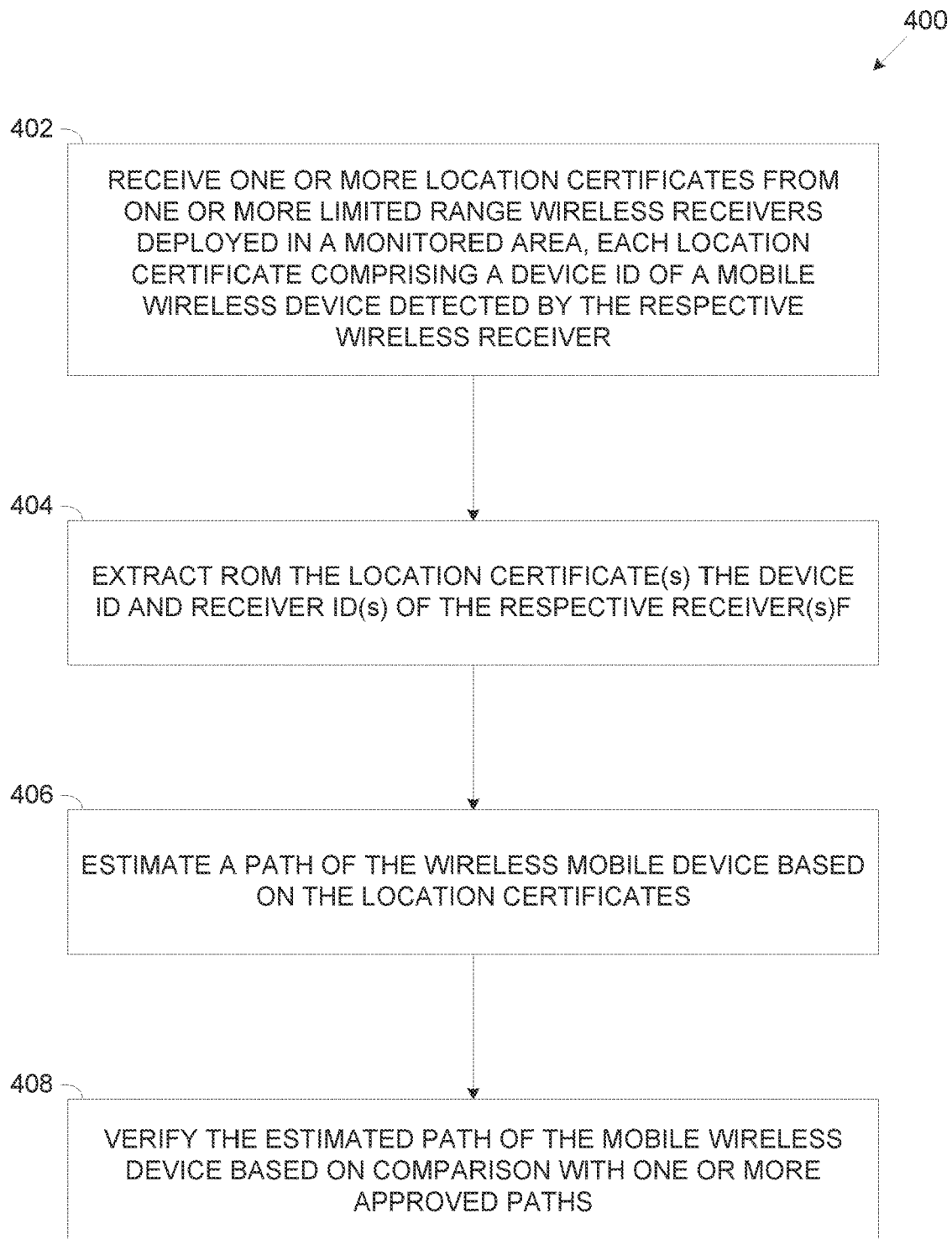
FIG. 4 is a flowchart of an exemplary process of verifying a path of a mobile wireless device in a monitored space based on wireless mapping recorded by wireless receivers deployed in the monitored space, according to some embodiments of the present invention.

Reference is now made to FIG. 4, which is a flowchart of an exemplary process of verifying a path of a mobile wireless device in a monitored space based on wireless mapping recorded by wireless receivers deployed in the monitored space, according to some embodiments of the present invention. An exemplary process 400 may be executed by each of one or more verification units such as the verification unit 206 deployed in a monitored space such as the monitored space 200.

As described in detail herein before, each verification unit 206 may be deployed at a respective checkpoint in the monitored space 200 to verify the path of one or more mobile wireless devices such as the mobile wireless device 202 each associated with a respective user or a respective disinfection apparatus as described in detail herein before.

One or more wireless receivers may be deployed in the monitored space to intercept data transmitted over one or more wireless channels according to one or more wireless technologies and/or protocols, for example, RF, BT, BLE, ZigBee, NFC, WLAN and/or the like. Each of the wireless receivers may be deployed at a respective predefined and known static (fixed) location in the monitored space 200, specifically the wireless receivers may be deployed to provide sufficient coverage of the monitored space 200.

Moreover, the wireless receivers deployed in the monitored space 200 may be limited range receivers having a limited reception range, for example, 0.5 meter, 1 meter, 1.5 meters, 2 meters and/or the like. The limited reception range may define, for each wireless receiver, a respective limited reception space in the monitored space 200 in proximity to the respective wireless receiver. This means that each of the wireless receivers may have a respective very limited reception area, typically a limited radius reception sphere around the respective wireless receiver where the radius equals the reception range. Therefore, each wireless receiver may intercept data transmitted by (originating from) one or more wireless transmitters located within the limited reception range of the respective wireless receiver.

Each of the wireless receivers may be connected to one or more of the verification units 206 via one or more wired and/or wireless channels deployed in the monitored space 200, for example, a serial channel, a Controller Area Network (CAN) bus, a Local Area Network (LAN), an RF link and/or the like.

While the mobile wireless device(s) 202 may not execute a specific and/or dedicated application to support the path verification, one or more of the mobile wireless devices 202 may typically continuously or periodically transmit a unique ID which may serve as a device ID for uniquely identifying the respective mobile wireless device 202. For example, one or more of the mobile wireless devices 202 may attempt to connect to a WLAN network and may thus broadcast its MAC address. In another example, one or more of the mobile wireless devices 202 may search to connect to a BT device or controller and may thus broadcast its BT ID. Therefore, while located, present and/or traveling in the monitored space 200, one or more of the mobile wireless device(s) 202 may transmit its unique device ID either continuously or periodically. One or more of the wireless receivers may therefore intercept the device ID transmitted by one or more of the mobile wireless device(s) 202 in the monitored space 200. However, due to the limited reception range of each of the wireless receivers, a respective wireless receiver may intercept only device ID(s) of mobile wireless device(s) 202 which are within the limited reception area of the respective wireless receiver.

As shown at 402, the process 400 starts with the verification unit 206 receiving one or more location certificates from one or more wireless receivers 504 deployed in the monitored space 200 which may communicate with the verification unit 206 via one or more of the wired and/or wireless channels deployed in the monitored space 200.

As described herein before, each of the location certificates received from each of the wireless receivers may include at least the device ID of one of the mobile wireless devices 202 which entered the limited reception range of the respective wireless receiver and the receiver ID of the respective wireless receiver.

Optionally, one or more of the location certificates further includes a timestamp computed by the respective wireless receiver(s) to indicate the reception time of the device ID of the respective mobile wireless devices 202 which entered the limited reception range of the respective wireless receiver. Typically, the wireless receivers 504 may compute the timestamp based on a timing reference received from the mobile wireless device 202. However, in another example, one or more of the wireless receivers 504 may compute the timestamp based on one or more internal timing, clock and/or counter circuits. Moreover, one or more of the internal counter circuits may be synchronized according to timing signals, for example, a beacon, a sync and/or the like transmitted periodically by one or more wireless transmitters and intercepted by the wireless receiver(s) 504.

Optionally, one or more of the location certificates is encrypted according to one or more of the cryptographic protocols and/or algorithms using one or more cryptographic keys available to one or more of the wireless receivers and to the verification unit 206.

As described for the process 100 and the monitored space 200, one or more of the wireless receivers may generate a plurality of location certificates for each of one or more of the mobile wireless devices 202 in case the respective mobile wireless device 202 goes in and out of the limited reception space of the respective wireless receiver.

As shown at 404, the verification unit 206 may analyze each received location certificate received from each wireless receiver to extract the device ID of the mobile wireless device 202 documented by the respective location certificate and the receiver ID of the respective wireless receiver.

The verification unit 206 may further arrange the received location certificates, specifically the wireless mapping information, i.e. the receiver IDs according to the device IDs of the mobile wireless device(s) 202. In other words, the verification unit may correlate each of the received location certificates with a respective mobile wireless device 202 such that each mobile wireless device 202 is associated with all location certificates documenting the respective mobile wireless device 202.

As shown at 406, the verification unit 206 may estimate the path of one or more of the mobile wireless device(s) 202 in the monitored space 200, specifically, the path of mobile wireless device(s) 202 which arrive at the checkpoint in which the verification unit 206 is deployed.

The verification unit 206 may estimate the path of the mobile wireless device 202 based on the predefined locations of the wireless receivers deployed in the monitored space 200 which are available to the verification unit 206 in a same manner as described herein before for the predefined locations of the wireless transceivers 204. In particular, the verification unit 206 may extract the receiver ID from each location certificate associated with the respective mobile wireless device 202 and since the verification unit 206 may associate between the extracted receiver IDs and the predefined locations of the wireless receivers, the verification unit 206 may identify the predefined locations of the wireless receivers which created the location certificates for the respective mobile wireless device 202. Based on the predefined locations of the wireless receive, the verification unit 206 may therefore compute the estimated path of the respective mobile wireless device 202 in the monitored space 200.

As shown at 408, the verification unit 206 may verify the estimated path of the mobile wireless device 202 by comparing between the estimated path and one or more approved paths as described in step 146 of the process 100. In case of a match between the estimated path and one of the approved path(s), the verification unit 206 may determine that the estimated path is valid and legitimate. However, in case the estimated path does not match any of the approved path(s), the verification unit 206 may determine that the estimated path is suspicious and potentially illegitimate and/or at least partially non-complaint with the approved path(s).

Again, as described in step 146, based on the determination of the path verification, the verification unit 206 may grant or deny access to the restricted area and/or the restricted resource to the user associated with the respective mobile wireless device 202 in case the path verification is directed to verify users associated with mobile wireless devices 202. Additionally and/or alternatively, based on the determination of the path verification, the verification unit 206 may determine whether the disinfection apparatus associated with the respective mobile wireless device 202 followed its predefined (planned) path in case the path verification is directed to verify the paths of disinfection apparatuses.

Figure 5:
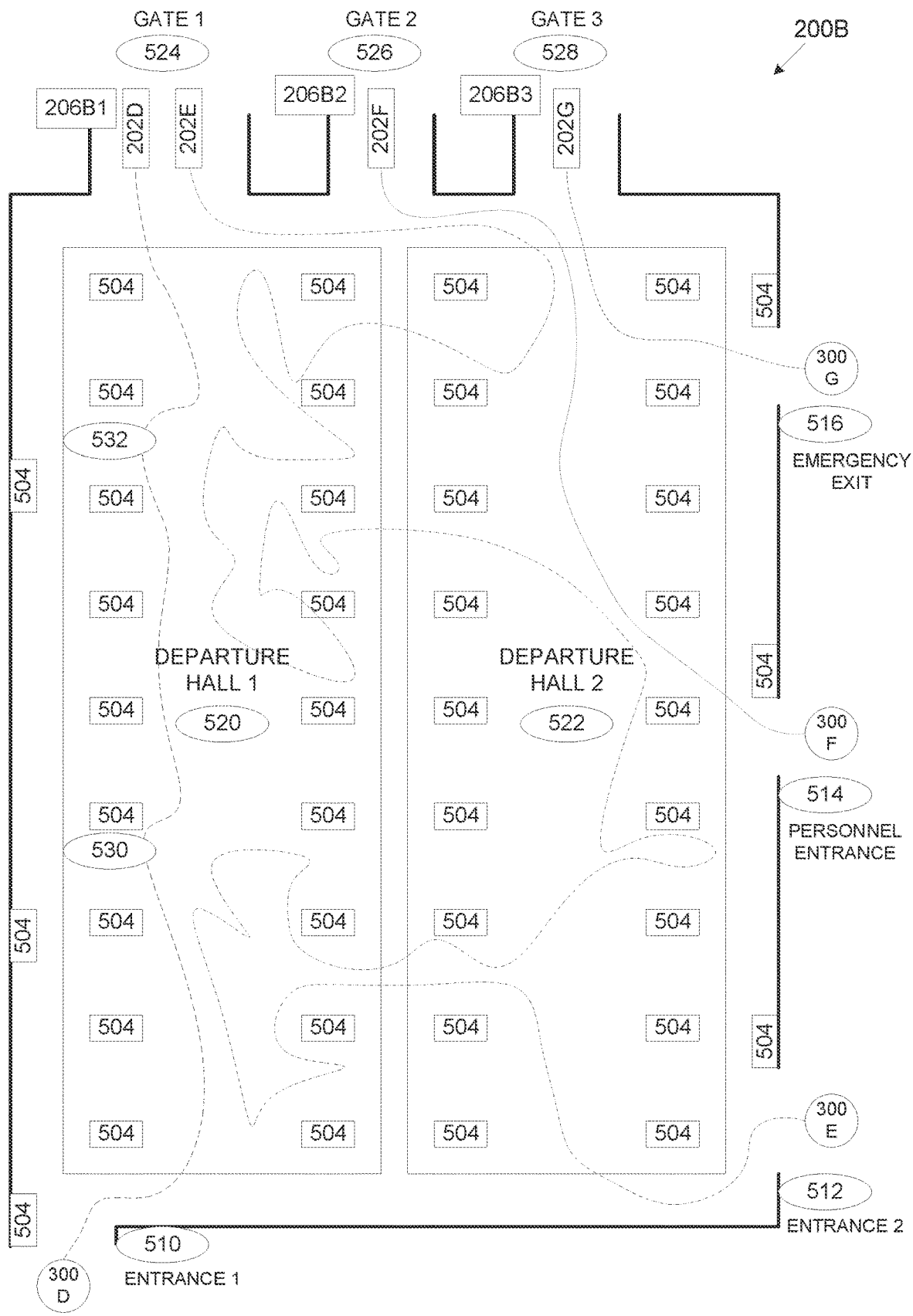
FIG. 5 is a schematic illustration of exemplary travel paths of mobile wireless devices evaluated for path verification in a second exemplary monitored space, according to some embodiments of the present invention.

Reference is also made to FIG. 5, which is a schematic illustration of exemplary travel paths of mobile wireless devices evaluated for path verification in a second exemplary monitored space, according to some embodiments of the present invention.

An exemplary monitored space 200B such as the monitored space 200, for example, an airport may comprise a plurality of departure halls, for example, a first departure hall 520 and a second departure hall 522 leading to a plurality of gates, for example, a first gate 524, a second gate 526 and a third gate 528. The two departure halls 520 and 522 may be entered from a plurality of entrances, for example, a first public entrance 510, a second public entrance 512, a personnel-only entrance 514 and an emergency exit 516.

A plurality of wireless receivers 504 may be deployed at various locations in the airport 200B, specifically at passage locations where passengers (users) may typical pass while traveling in the airport 200B, for example, users flying out of the airport 200B who travel towards the gates in order to board an airplane. The wireless receivers 504 may be therefore deployed to effectively cover the airport 200B to traveling passengers, for example, at the entrances 510 and 512, at the personnel-only entrance 514, at the emergency exit 518, in each of the departure halls 520 and 522, at the gates 524, 526, 528 and/or the like.

One or more verification units 206B such as the verification unit 206 may be deployed in the airport 200B, for example, a first verification unit 206B1 may be deployed at the first gate 514, a second verification unit 206B2 may be deployed at the second gate 516 and a third verification unit 206B3 may be deployed at the third gate 518.

A first passenger associated with a first mobile wireless device 202D may travel to the first gate 524 in a first path 300D, a second passenger associated with a second mobile wireless device 202E may also travel to the first gate 524 in a second path 300E, a third passenger associated with a third mobile wireless device 202F may travel to the second gate 526 in a third path 300F and a fourth passenger associated with a fourth mobile wireless device 202G may travel to the third gate 528 in a first path 300D.

As seen, the path 300D starts from the first entrance 510 and goes through the first departure hall 520 to the first gate 524. Since the mobile wireless device 202D may continuously or periodically transmit its device ID, one or more of the wireless receivers 504 located along the path 300D may intercept the device ID of the mobile wireless device 202D and may transmit respective location certificates to one or more of the verification units 206B1, 206B2 and/or 206B3. For example, the wireless receiver 504 deployed at the first entrance 510 s well as one or more of the wireless receivers 504 deployed in the first departure hall 520 may intercept the device ID of the mobile wireless device 202D.

The path 300E starts from the second entrance 512 and goes through both departure halls 520 and 522 to the first gate 524. Since the mobile wireless device 202E may continuously or periodically transmit its device ID, one or more of the wireless receivers 504 located along the path 300E may intercept the device ID of the mobile wireless device 202E and may transmit respective location certificates to one or more of the verification units 206B1, 206B2 and/or 206B3. For example, the wireless receiver 504 deployed at the second entrance 512, one or more of the wireless receivers 504 deployed in the first departure hall 520 and/or one or more of the wireless receivers 504 deployed in the second departure hall 522 may intercept the device ID of the mobile wireless device 202E.

The path 300F starts from the personnel-only entrance 514 and goes through the second departure hall 522 to the second gate 526. Since the mobile wireless device 202F may continuously or periodically transmit its device ID, one or more of the wireless receivers 504 located along the path 300F may intercept the device ID of the mobile wireless device 202F and may transmit respective location certificates to one or more of the verification units 206B1, 206B2 and/or 206B3. For example, the wireless receiver 504 deployed at the personnel-only entrance 514 as well as one or more of the wireless receivers 504 deployed in the second departure hall 522 may intercept the device ID of the mobile wireless device 202F.

The path 300G starts from the emergency exit 516 personnel-only entrance 514 and goes through the second departure hall 522 to the third gate 528. Since the mobile wireless device 202G may continuously or periodically transmit its device ID, one or more of the wireless receivers 504 located along the path 300G may intercept the device ID of the mobile wireless device 202G and may transmit respective location certificates to one or more of the verification units 206B1, 206B2 and/or 206B3. For example, the wireless receiver 504 deployed at the emergency exit 516 as well as one or more of the wireless receivers 504 deployed in the second departure hall 522 may intercept the device ID of the mobile wireless device 202F.

When the passengers arrive at one of the gates 524, 526 and/or 528, the passengers may be authenticated, validated and/or otherwise verified by a respective verification unit 206B deployed at the respective gate according to their path in the airport 200B.

For example, when the passenger associated with the mobile wireless device 202D arrives at the first gate 524, the verification unit 206B1 may analyze all the location certificates associated with the mobile wireless device 202D which were received from the one or more of the wireless receivers 504, specifically the wireless receivers 504 located along the path 300D. The verification unit 206B1 may extract the receiver IDs of the respective wireless receivers 504 that intercepted the device ID of the mobile wireless device 202D and transmitted respective location certificates. The verification unit 206B1 may then compute an estimated path 300D according to the predefined locations of the respective wireless receivers 504. As described herein before, the verification unit 206B1 may further use the timestamp included in one or more of the location certificates to compute a time-lined estimated path 300D. The verification unit 206B1 may compare the estimated path 300A to one or more approved paths leading to the first gate 524, in particular an approved path which is a straight route from the first entrance 510 to the first gate 524 and may determine that the estimated path 300D is a valid and legitimate path. Based on this determination, the verification unit 206B1 may verify the user associated with the mobile wireless device 202D and may classify him as a verified legitimate passenger.

In another example, when the passenger associated with the mobile wireless device 202E arrives at the first gate 524, the verification unit 206B1 may analyze all the location certificates associated with the mobile wireless device 202E which were received from the one or more of the wireless receivers 504, specifically the wireless receivers 504 located along the path 300E. The verification unit 206B1 may extract the receiver IDs of the respective wireless receivers 504 that intercepted the device ID of the mobile wireless device 202E and transmitted respective location certificates. The verification unit 206B1 may then compute an estimated path 300E according to the predefined locations of the respective wireless receivers 504. The verification unit 206B1 may further use the timestamp included in one or more of the location certificates to compute a time-lined estimated path 300E. The verification unit 206B1 may compare the estimated path 300E to one or more approved paths leading to the first gate 524 and may determine that the estimated path 300E is highly suspicious as it includes a lot of incoherent movement patterns. The incoherent movement patterns starting from entering the airport 200B at the second gate 512 which is the furthest from the first gate 524 and followed by a plurality of rapid transitions between the first and second departure halls 520 and 522 respectively and finally going to the first gate 524 from the second departure hall 522 which is further away from the first gate 524 compared to the first departure hall 520. The suspicious incoherent movement may be indicative, for example, of a person potentially closely exploring the airport 200B and seeking for a way to perform some illegal and/or malicious operation at the airport 200B. In another example, the suspicious incoherent movement may be indicative of an irritated and/or nervous person who is stressed due to some illegal and/or malicious operation he plans to carry out in the airport 200B. Based on this determination, the verification unit 206B1 may classify the passenger associated with the mobile wireless device 202E as a non-legitimate passenger and optionally a potential threat.

In another example, when the passenger associated with the mobile wireless device 202F arrives at the second gate 526, the verification unit 206B2 may analyze all the location certificates associated with the mobile wireless device 202F which were received from the one or more of the wireless receivers 504, specifically the wireless receivers 504 located along the path 300F. The verification unit 206B2 may extract the receiver IDs of the respective wireless receivers 504 that intercepted the device ID of the mobile wireless device 202F and transmitted respective location certificates. The verification unit 206B2 may then compute an estimated path 300F according to the predefined locations of the respective wireless receivers 504. The verification unit 206B2 may further use the timestamp included in one or more of the location certificates to compute a time-lined estimated path 300F. The verification unit 206B2 may compare the estimated path 300F to one or more approved paths leading to the second gate 526 and may determine that the estimated path 300F is highly suspicious as it starts from the personnel-only entrance 514 which is restricted to the public. The suspicious entry from the personnel-only entrance 514 may be indicative, for example, of a person trying to sneak undetected past security which is typically stationed at the main public entrances such as, for example, the first entrance 510 and/or the second entrance 512. Based on this determination, the verification unit 206B2 may classify the passenger associated with the mobile wireless device 202F as a non-legitimate passenger and optionally a potential threat.

In another example, which is very similar to the previous example, when the passenger associated with the mobile wireless device 202G arrives at the third gate 528, the verification unit 206B3 may analyze all the location certificates associated with the mobile wireless device 202G which were received from the one or more of the wireless receivers 504, specifically the wireless receivers 504 located along the path 300G. The verification unit 206B3 may extract the receiver IDs of the respective wireless receivers 504 that intercepted the device ID of the mobile wireless device 202G and transmitted respective location certificates. The verification unit 206B3 may then compute an estimated path 300G according to the predefined locations of the respective wireless receivers 504. The verification unit 206B3 may further use the timestamp included in one or more of the location certificates to compute a time-lined estimated path 300G. The verification unit 206B3 may compare the estimated path 300G to one or more approved paths leading to the third gate 528 and may determine that the estimated path 300G is highly suspicious as it starts from the emergency exit 516 which may be typically closed and restricted to the public. The suspicious entry from the emergency exit 516 may be indicative, for example, of a person trying to sneak undetected past security which is typically stationed at the main public entrances. Based on this determination, the verification unit 206B3 may classify the passenger associated with the mobile wireless device 202G as a non-legitimate passenger and optionally a potential threat.

Optionally, the verification unit 206B1 analyzes the estimated path of the with respect to one or more of the approved path(s) according to one or more deviation patterns.

For example, one or more of the passengers entering the airport 200B may travel to their designated gate through the departure halls but may deviate to some extent from the typical approved paths that serve as the basis for comparison and verification by one or more of the verification units 206, specifically the verification units 206B. For example, as seen the estimated path 300D of the passenger associated with the mobile wireless devices 202D deviates towards a first area 530 and a second area 532. However, the first and/or second areas 530 and 532 may be legitimate locations for passengers to visit, for example, toilets, a food court, a change booth, a news stand and/or the like. The verification unit 206B1 may therefore evaluate the deviation patterns identified in the estimated path 300D, specifically in the time-lined estimated path 300D to evaluate and/or determine whether the deviations are legitimate or they may be indicative of some suspicious behavior of the passenger associated with the mobile wireless devices 202D. Based on this evaluation and/or determination, the verification unit 206B1 may classify the passenger associated with the mobile wireless device 202D as a legitimate passenger or as a non-legitimate passenger and optionally a potential threat.

Optionally, one or more users associated with receptive mobile wireless devices 202 are correlated with the mobile wireless devices 202 based on visual identification of each such user in at least one image captured at a time of transmission of a location certificate from a respective one of the wireless receivers 504. At the time of the location certificate transmission, the mobile wireless devices 202 associated with the respective user is within the limited reception range of the respective wireless receiver 504 and the associated user may be therefore spatially mapped in the monitored space 200, specifically in close proximity to the respective wireless receiver 504. As such one or more images captured to depict the close proximity of the respective wireless receiver 504 at the time of the location certificate transmission may further depict the associated user. The image(s) depicting the associated user may be analyzed as known in the art to identify and extract one or more visual features of the associated user, for example, a face, a cloth article, a haircut, a body outline and/or posture and/or the like which may be used to visually correlate the respective user with its associated mobile wireless device 202.

The features of the correlated user(s) may be further detected in one or more additional images captured by one or imaging sensors deployed in the monitored space 200 and based on the identified features, the correlated user(s) may be visually tracked in the monitored space 200. Visual tracking information describing a spatial mapping (location, movement, etc.) of the correlated user(s) may be thus generated for the correlated user(s) tracked while traveling in the monitored space 200. The verification unit 206 may thus receive both the wireless mapping of one or more of the mobile wireless devices 202 and may further receive the visual tracking information of the respective associated user correlated with the respective mobile wireless device 202. The verification unit 206 may fuse together the wireless mapping information collected for a respective mobile wireless device 202 and the visual tracking information of the respective associated user visually correlated with the respective mobile wireless device 202 to compute a significantly more accurate estimated path for the respective user(s).

According to some embodiments of the present invention, the path verification may be combined for both users and disinfections apparatuses. Specifically, the path of one or more users through the monitored space 200 may be estimated and one or more (approved) paths may be defined accordingly for one or more disinfection apparatuses to follow the path(s) of the user(s) in order to disinfect surfaces which the user(s) may have touched and potentially contaminated. Moreover, the path(s) of the disinfection apparatus(s) may be verified to ensure that all surfaces suspected to be touched by the user(s) are properly disinfected.

To this end, one or more verification units 206 may be deployed in the monitored space 200 to compute an estimated path for one or more users according to the wireless mapping extracted from the location certificates collected by the mobile wireless device 202 associated with each of the user(s) from the wireless devices deployed along the respective path. One or more (approved) paths may be then predefined for one or more disinfection apparatuses based on the estimated path(s) of the user(s). In particular, the predefined path(s) may move between surfaces along the estimated path(s) of the user(s) which may have been touched and hence possibly contaminated by the user(s). The predefined path(s) may be delivered for operating the disinfection apparatus(s) accordingly to disinfect all such potentially contaminated surfaces.

During the disinfection process the mobile wireless device 202 associated with each disinfection apparatus may collect location certificates form the wireless devices located along the predefined path(s).

After completing the disinfection process according to the predefined path(s), the verification unit 206 may analyze the location certificates collected by the wireless device 202 associated with each disinfection apparatus to compute an estimated path for each disinfection apparatus and verify accordingly that the respective disinfection apparatus traveled along the predefined path to effectively carry out the disinfection process.

According to some embodiments of the present invention, one or more mobile wireless devices such as the mobile wireless device 202 may be authenticated to verify their identity before granted access to one or more secure assets, for example, a secure system, a secure service, a secure location and/or the like. In particular, each mobile wireless device 202 may be authenticated based on one or more wireless transceivers such as the wireless transceiver 204 which are attached to the respective mobile wireless device 202.

Figure 6:
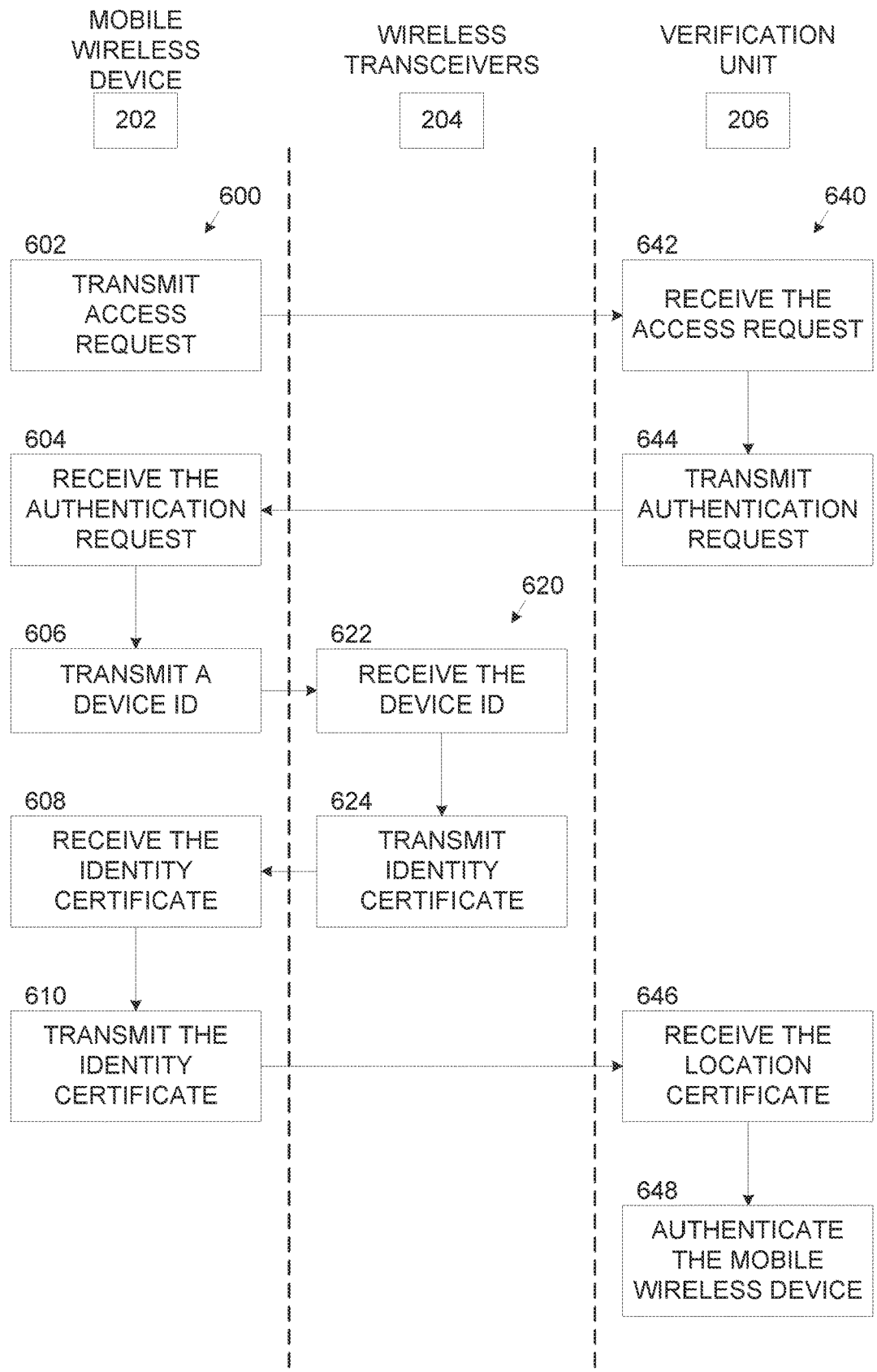
FIG. 6 is a flowchart of exemplary processes of authenticating a mobile wireless device based on a wireless transceiver attached to the mobile wireless device, according to some embodiments of the present invention.

Reference is now made to FIG. 6, which is a flowchart of exemplary processes of authenticating a mobile wireless device based on a wireless transceiver attached to the mobile wireless device, according to some embodiments of the present invention.

An exemplary process 600 may be executed by a mobile wireless device such as the mobile wireless device 202 to authenticate itself in order to get access to one or more secure assets, for example, a secure system, a secure service, a secure location and/or the like. One or more wireless transceivers 204 independent of the mobile wireless device 202 and are physically attached to it may execute an exemplary process 620 for interacting with the mobile wireless device 202 to support its authentication. An exemplary process 640 may be executed by a verification unit such as the verification unit 206 for authenticating the mobile wireless device 202 based on one or more of its attached wireless transceiver(s) 204 and grant or deny the mobile wireless device 202 access to the secure asset(s).

Figure 7:
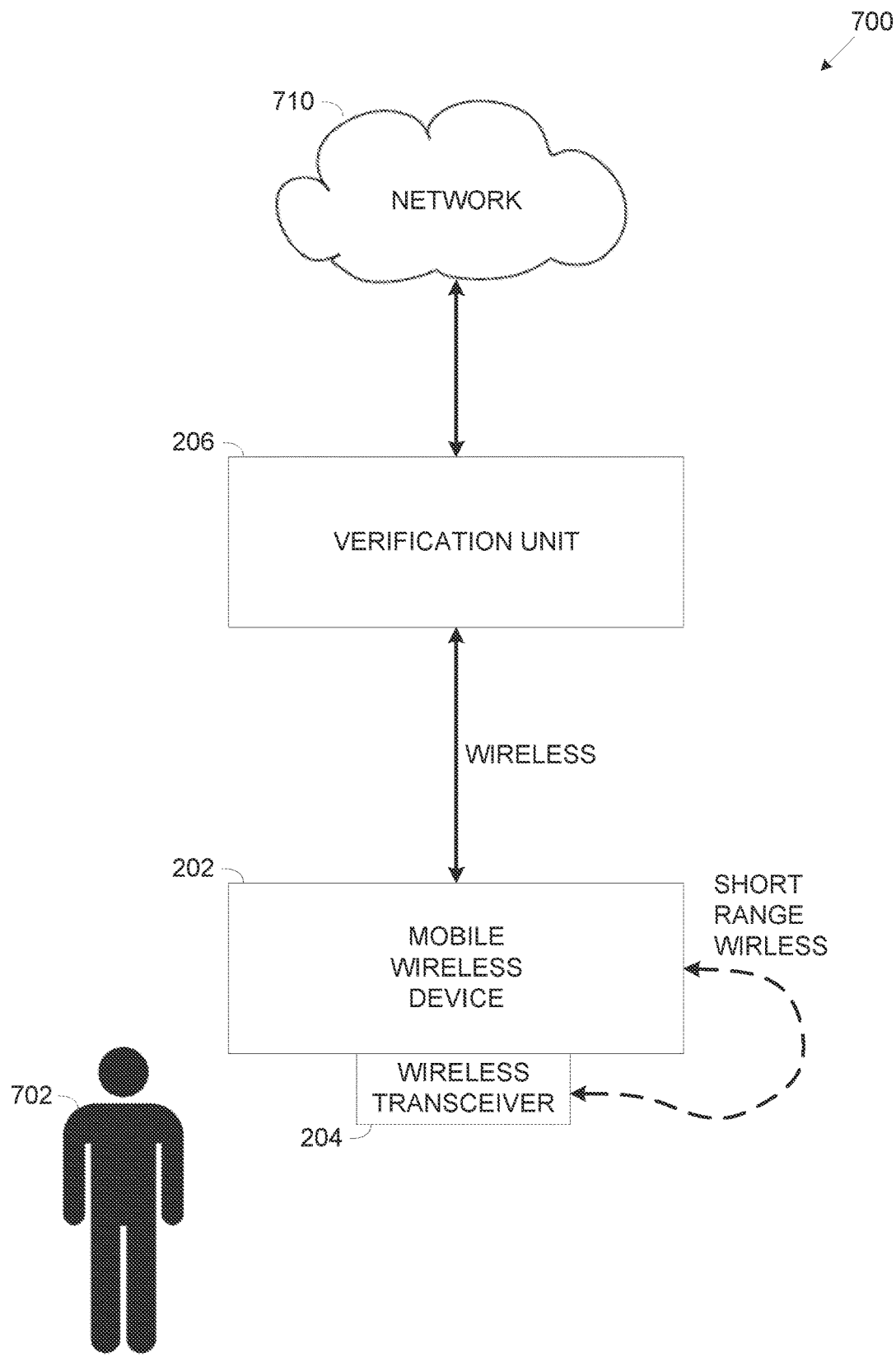
FIG. 7 is a schematic illustration of an exemplary system for verifying authenticating a mobile wireless device based on a wireless transceiver attached to the mobile wireless device, according to some embodiments of the present invention.

Reference is also made to FIG. 7, which is a schematic illustration of an exemplary system for verifying authenticating a mobile wireless device based on a wireless transceiver attached to the mobile wireless device, according to some embodiments of the present invention.

A user 704 using the mobile wireless device 202 may request access to one or more secure assets, for example, a secure system, a secure service, a secure location and/or the like, for example, a confidential database, a high security defense system, a restricted access laboratory, a limited access office, an Automatic Teller Machine (ATM) and/or the like.

The mobile wireless device 202 may be uniquely associated with one or more wireless transceivers 204 which are physically attached (coupled) to the mobile wireless device 202. The association of the mobile wireless device 202 with its attached wireless transceiver(s) 204 may be predefined and logged in one or more listing records, for example, a list, a table, a database and/or the like which associate each of a plurality of mobile wireless devices 202 with respective one or more wireless transceivers 204 attached to the respective mobile wireless device 202.

The one or more wireless transceiver(s) 204, for example, a sticker, a label, a Nano scale device and/or the like may be attached (physically coupled) to the mobile wireless device 202 using one or more methods, techniques and/or implementations. For example, one or more wireless transceivers 204 may be attached to the mobile wireless device 202 using one or more adhesive materials. In another example, one or more wireless transceivers 204 may be installed in one or more slots of the mobile wireless device 202, for example, a Subscriber Identification Module (SIM) card slot, a memory expansion slot and/or the like. In another example, one or more wireless transceivers 204 may be attached to the mobile wireless device 202 via one or more screws.

Moreover, one or more wireless transceivers 204 may be attached to the mobile wireless device 202 in one or more limited accessibility locations, for example, within a frame of the mobile wireless device 202 and/or the like such that access to the wireless transceiver(s) 204, specifically access of unauthorized and potentially malicious parties to the wireless transceiver(s) 204 is very difficult and potentially impossible.

The wireless transceiver(s) 204 may be battery-less wireless transceivers powered by energy harvested from the mobile wireless device 202 using one or more energy harvesting technologies. Specifically, the wireless transceiver(s) 204 may capture energy from Radio Frequency (RF) transmission originating from the mobile wireless device 202. These battery-less wireless transceivers may 204 be extremely simple and very low cost and may be therefore available in easy deployment forms, for example, a sticker, a label and/or the like which may be easily attached to the mobile wireless device and thus highly suitable for wide spread deployment in the monitored space 200.

The wireless transceiver(s) 204 attached to the mobile wireless device 202 may be limited range transceivers having a very short transmission range defining a close proximity reception area having a small radius, for example, a radius in a range of 5-30 centimeters and/or the like. As such, only when the mobile wireless device 202 is located within the close proximity reception area, the mobile wireless device 202 is capable of interacting with the attached wireless transceiver(s) 204. This means that only when the wireless transceiver(s) 204 are actually attached (physically coupled) to mobile wireless device 202, the mobile wireless device 202 may be able to communicate with its attached wireless transceiver(s) 204. Furthermore, no other devices even such devices which are in very close proximity to the mobile wireless device 202 may be able to communicate with the wireless transceiver(s) 204 attached to the mobile wireless device 202.

As described herein before, the wireless transceiver(s) 204 may operate according to one or more wireless technologies and/or protocols, for example, WLAN, Wi-Fi, Bluetooth, Bluetooth low energy (BLE), ZigBee and/or the like. In particular, the wireless transceiver(s) 204 may be configured to communicate according to one or more Personal Area Network (PAN) protocols which may define the short transmission range of the wireless transceiver(s) 204. Such PAN protocols may include, for example, IrDA, Wireless USB, Bluetooth, ZigBee and/or the like having a very short transmission range (reach) for example, a few centimeters.

The verification unit 206 may be configured to authenticate the mobile wireless device 202 prior to granting access to one or more of the secure assets to the mobile wireless device 202, specifically to the user 702 associated with the mobile wireless device 202. In case of successful authentication, the verification unit 206 may grant the mobile wireless device 202 access to the secure asset(s). However, in case the verification unit 206 fails to properly authenticate the mobile wireless device 202, i.e., a failed authentication, the verification unit 206 may deny the mobile wireless device 202 access to the secure asset(s).

The verification unit 206 may further include one or more wired and/or wireless interfaces for connecting to a network 710 comprising one or more wired and/or wireless networks, for example, a Local Area Network (LAN), a Wireless LAN (WLAN), a Wide Area Network (WAN), a Municipal Area Network (MAN), a cellular network, the internet and/or the like.

The verification unit 206 may communicate with the mobile wireless device 202 via one or more of the wireless communication channels established between the mobile wireless device 202 and the verification unit 206. The verification unit 206 may be therefore deployed in various locations, architectures and/or modes typically according to the secure asset(s) for which the verification unit 206 controls user access. For example, the verification unit 206 may be deployed in close proximity to the secure asset(s) to directly communicate with the mobile wireless device 202. In another example, the verification unit 206 may be remote and may communicate via the network 710 with one or more access control systems of the secure asset(s) serving as relays between the verification unit 206 and the mobile wireless device 202 meaning that the verification unit 206 may communicate with the mobile wireless device 202 through the access control system(s).

For example, assuming the secure asset is a restricted access location, the verification unit 206 may be deployed at one or more entrances to the restricted access location and/or communicate with one or more access control systems deployed at the entrance(s). In another example, assuming the secure asset is a secure service, for example, the ATM, the verification unit 206 may be deployed, for example, attached, integrated and/or otherwise coupled to the ATM system. In another deployment, the verification unit 206 may communicate one or more access control systems deployed at the ATM to control access to the ATM configured to communicate with the mobile wireless device 202.

The processes 600, 620 and 640 as well as the system 700 are described for a single verification unit 206 authenticating a single mobile wireless device 202 attached with only a single wireless transceiver 204. This however should not be construed as limiting since the processes 600, 620 and 640 and complementary the system 700 may be expanded to a plurality of verification units 206 each configured to authenticate a plurality of mobile wireless devices 202 each attached with one or more wireless transceiver 204.

As shown at 602, the process 600 executed by the mobile wireless device 202 starts with the mobile wireless device 202 typically operated by the user 702 requesting to access one or more of the secure assets.

As shown at 642, the verification unit 206 executing the process 640 may receive the access request issued by the mobile wireless device 202.

As shown at 644, in response to the received access request, the verification unit 206 may transmit an authentication request to the mobile wireless device 202 in order to authenticate the mobile wireless device 202 prior to granting it access to the secure asset(s).

As shown at 604, the mobile wireless device 202 may receive the authentication request sent by the verification unit 206.

As shown at 606, the mobile wireless device 202 may transmit its device ID via one or more of the wireless channels supported by the wireless interface 210, for example, BT, BLE, ZigBee, WLAN and/or the like. Specifically, the mobile wireless device 202 may transmit its device ID via one or more wireless channels defined by the common communication and interaction protocols employed for communication between the mobile wireless devices 202 and the wireless transceiver(s) 204 attached to the mobile wireless device 202.

As described herein before for the process 100, the device ID transmitted by each mobile wireless device 202 may be uniquely associated with the respective mobile wireless device 202 such that each mobile wireless device 202 may be identified may be definitively and unambiguously identified by its associated device ID. The mobile wireless device 202 may transmit its device ID according to the protocol(s), standard and/or proprietary, defined for communication between the mobile wireless device 202 and its attached wireless transceiver(s) 204.

The mobile wireless device 202 may transmit its device ID according to one or more transmission and/or timing parameters. For example, the mobile wireless device 202 may transmit its device ID on event, for example, in response to the authentication request received from the verification unit 206. In another example, the mobile wireless device 202 may continuously transmit its device ID. In another example, the mobile wireless device 202 may transmit its device ID periodically. Moreover, one or more of the transmission parameters may further define a time period between subsequent transmission, for example, 1 second, 2 seconds, 5 seconds and/or the like. In another example, the transmission parameters may define a transmission signal strength, for example, low signal strength and/or the like in order to limit the transmission range of the device ID.

As shown at 622, the wireless transceiver(s) 204 attached to the mobile wireless device 202 may intercept the device ID transmitted by the mobile wireless device 202.

As shown at 624, the attached wireless transceiver(s) 204 transmit in response to the received device ID one or more identity certificates for the mobile wireless device 202.

Each identity certificate may include at least the device ID of the mobile wireless device 202 and a transceiver ID uniquely associated with the respective attached wireless transceiver 204 as described herein before.

Optionally, one or more of the identity certificate(s) transmitted by one or more of the attached wireless transceiver(s) 204 may further include a timestamp indicative of a transmission time of the respective identity certificate from the respective wireless transceiver 204. The wireless transceiver 204 may generate the timestamp based on one or more timing mechanisms as described herein before.

Optionally, one or more of the identity certificate(s) transmitted by one or more of the attached wireless transceiver(s) 204 may further include an OTP which is valid for a limited time period after which the identity certificate is invalid and hence unusable. The attached wireless transceiver(s) 204 may apply one or more methods, techniques and/or algorithms as known in the art to create the OTP. For example, a certain attached wireless transceiver 204 may create the OTP using a random seed uniquely associated with the certain attached wireless transceiver 204 which may be used to initialize a random number generator, a pseudo-random number generator and/or the like.

Optionally, one or more of the identity certificate(s) transmitted by one or more of the attached wireless transceiver(s) 204 may be encrypted according to one or more of the encryption protocols using one or more cryptographic keys which are available to the respective wireless transceiver 204 and known to the verification unit(s) 206. For example, one or more of the attached wireless transceivers 204 may encrypt one or more of the identity certificate(s) using a private key of an asymmetric key pair uniquely assigned to the respective attached wireless transceiver 204, for example, a Public Key Infrastructure (PKI). A public key which is associated with respective attached wireless transceiver 204 and is publicly distributed may be derived from the private key of the asymmetric key pair of the respective attached wireless transceiver 204. As such, the publicly available public key may be used to decrypt the identity certificate(s) encrypted using the respective private key.

It should be noted, that the mobile wireless device 202 may be unable to decrypt encrypted location certificates since it does not have access to the cryptographic key(s) used by the wireless transceiver(s) 204.

As shown at 608, the mobile wireless device 202 may receive the identity certificate(s) transmitted by the attached wireless transceiver(s) 204. Since the attached wireless transceiver(s) 204 have the very short transmission range defining the close proximity reception area, only the mobile wireless device 202 which is in close proximity to the mobile wireless device 202 may receive the identity certificate(s) transmitted by its attached wireless transceiver(s) 204.

Moreover, no other device even such devices located in close proximity to the mobile wireless device 202 may be able to intercept the identity certificate(s) transmitted by the wireless transceiver(s) 204 attached to the mobile wireless device 202.

As shown at 610, the mobile wireless device 202 may transmit the identity certificate(s) to the verification unit 206 in order to authenticate itself.

As shown at 646, the verification unit 206 may receive the identity certificate(s) from the mobile wireless device 202.

As shown at 648, the verification unit 206 may authenticate the mobile wireless device 202 based on the received identity certificate(s).

Specifically, the verification unit 206 may extract the device ID and the transceiver ID from each identity certificate received from the mobile wireless device 202 and may verify that the wireless transceiver 204 identified by the transceiver ID is genuinely associated and actually attached to the mobile wireless device 202 identified by the device ID.

In order to determine the association between the mobile wireless device 202 and the attached wireless transceiver 204 identified in each identity certificate, the verification unit 206 may access one or more of the listing records which associate each of a plurality of mobile wireless device 202 with respective one or more wireless transceivers 204 attached to the respective mobile wireless device 202. The listing record(s) may be stored in one or more storage resources. For example, one or more of the listing record(s) may be locally stored by the verification unit 206, for example, in the storage 224. In another example, one or more of the listing record(s) may be stored in one or more networked resources, for example, a storage server, a Network Attached Storage (NAS), a cloud storage and/or the like which are accessible to the verification unit 206 via the network 710.

In case one or more of the received identity certificates are encrypted, the verification unit 206 having access to the cryptographic key(s) used to encrypt the location certificate(s) may use the cryptographic key(s) to decrypt the encrypted location certificate(s). For example, assuming a certain wireless transceiver 204 encrypted a certain identity certificate using its private key, the verification unit 206 may use the respective public key to decrypt the certain identity certificate. Moreover, as known in the art, by successfully decrypting the certain identity certificate using the respective public key, the verification unit 206 may further verify the certain wireless transceiver 204 is the origin of the certain identity certificate.

Moreover, in case one or more of the received identity certificates include a time stamp, the verification unit 206 may further verify that the respective identity certificate is valid, i.e., the respective identity certificate was generated for the current authentication session. The verification unit 206 may therefore verify that the time stamp of the respective identity certificate is within a predefined time interval prior to the current time, for example, 30 seconds, 1 minute, 3 minutes and/or the like. This may prevent malicious access attempts to the secure asset(s) by a potentially malicious mobile wireless device 202 which may intercept an identity certificate previously generated by a legitimate mobile wireless device 202 and falsely use the intercepted identity certificate in attempt to imitate as the legitimate mobile wireless device 202.

Furthermore, in case one or more of the received identity certificates include an OTP, the verification unit 206 may verify that the OTP is valid, i.e., the OTP was generated for the current authentication session. The verification unit 206 which may have access to the random seed uniquely associated with each attached wireless transceiver 204 may use the random seed to verify the OTP was genuine generated by the respective attached wireless transceiver 204 and that the time of creation of the OTP has not expired.

Based on an outcome of the authentication, the mobile wireless device 202 may be granted or denied access to the secure asset(s). In particular, in case of successful authentication, the mobile wireless device 202 may be allowed to access the secure asset(s) while in case of unsuccessful authentication, i.e., failed authentication, the mobile wireless device 202 may not be allowed to access the secure asset(s). The actual access control may be done according to the deployment of the verification unit and the nature and/or type of the secure asset(s) that the mobile wireless device 202 attempts to access. For example, in some deployments the verification unit 206 itself may control the access of the mobile wireless device 202 to the secure asset(s) and may thus granted or denied the access based on the outcome of the authentication. However, in some deployments the access to the secure asset(s) may be controlled by one or more access control systems independent of the verification unit 206. In such deployments, the verification unit 206 may communicate with the independent access control system(s), for example, via the network 710, to provide the authentication outcome to these independent access control system(s) which may use the authentication outcome to control access of the mobile wireless device 202 to the secure asset(s).

For example, assuming the user 702 attempts to access to a limited access system and/or service and the verification unit 206 is locally deployed and configured to validate the user 702 based on authentication of its associated mobile wireless device 202. In such case, the verification unit 206 may directly grant the user 702 access to the limited access system and/or service in case of successfully authenticating the associated mobile wireless device 202 and deny the user 702 access to the limited access system and/or service in case of authentication failure. In another example, assuming the user 702 attempts to access to a restricted area, for example, a restricted access laboratory, which is controlled by one or more access control systems deployed at the laboratory's entrance(s). In such case, the verification unit 206 may transmit the authentication outcome to the access control system(s) which in turn may grant the user 702 access to the restricted access laboratory in case of successful authentication of the associated mobile wireless device

202 and deny the user 702 access to the restricted access laboratory in case of authentication failure.

According to some embodiments of the present invention, one or more mobile wireless devices such as the mobile wireless device 202 may be authenticated based on their geolocation in order to verify their identity before granted access to one or more of the secure assets.

Figure 8:
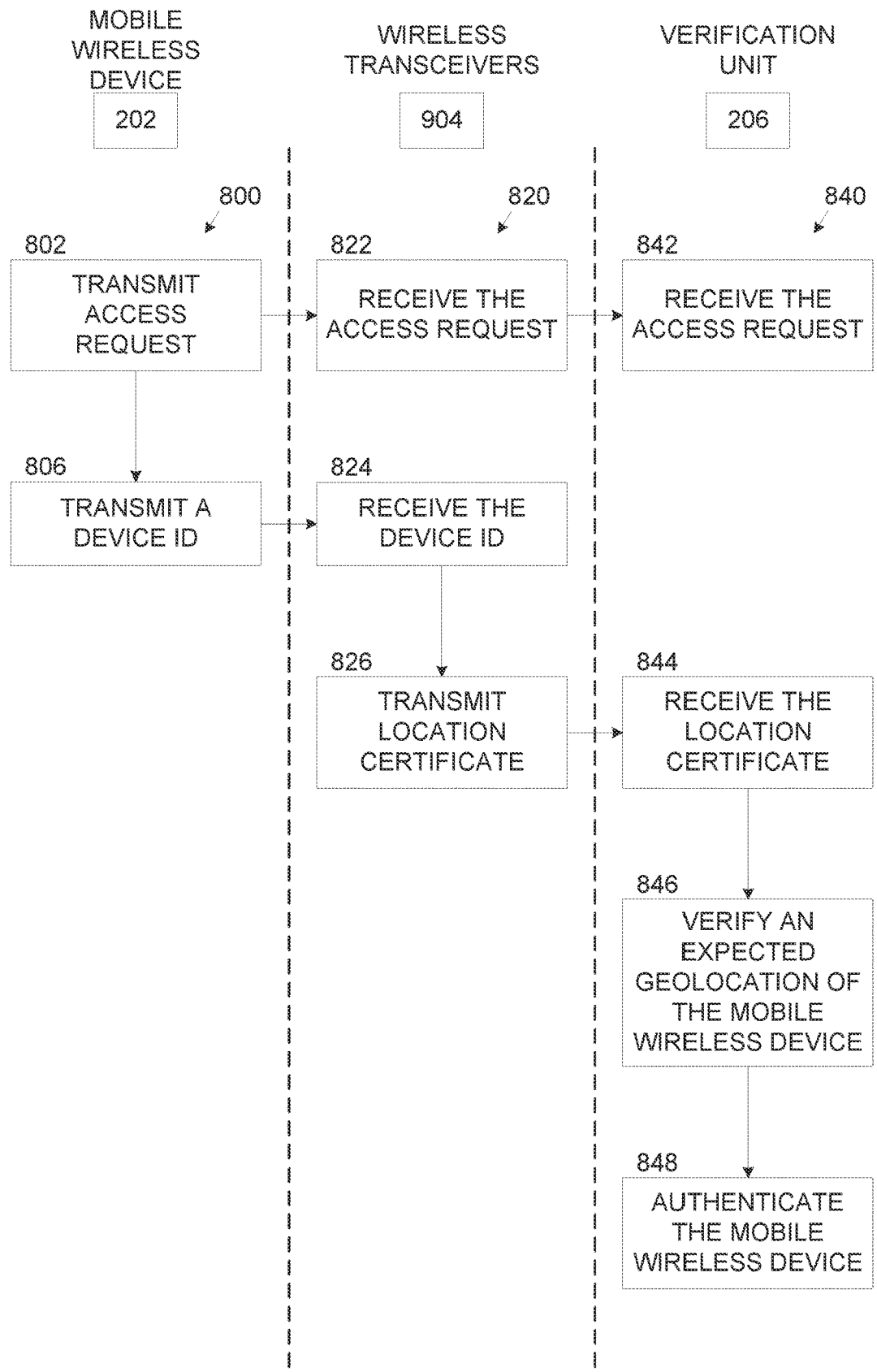
FIG. 8 is a flowchart of an exemplary process of authenticating a mobile wireless device based on its geolocation, according to some embodiments of the present invention.
Figure 9:
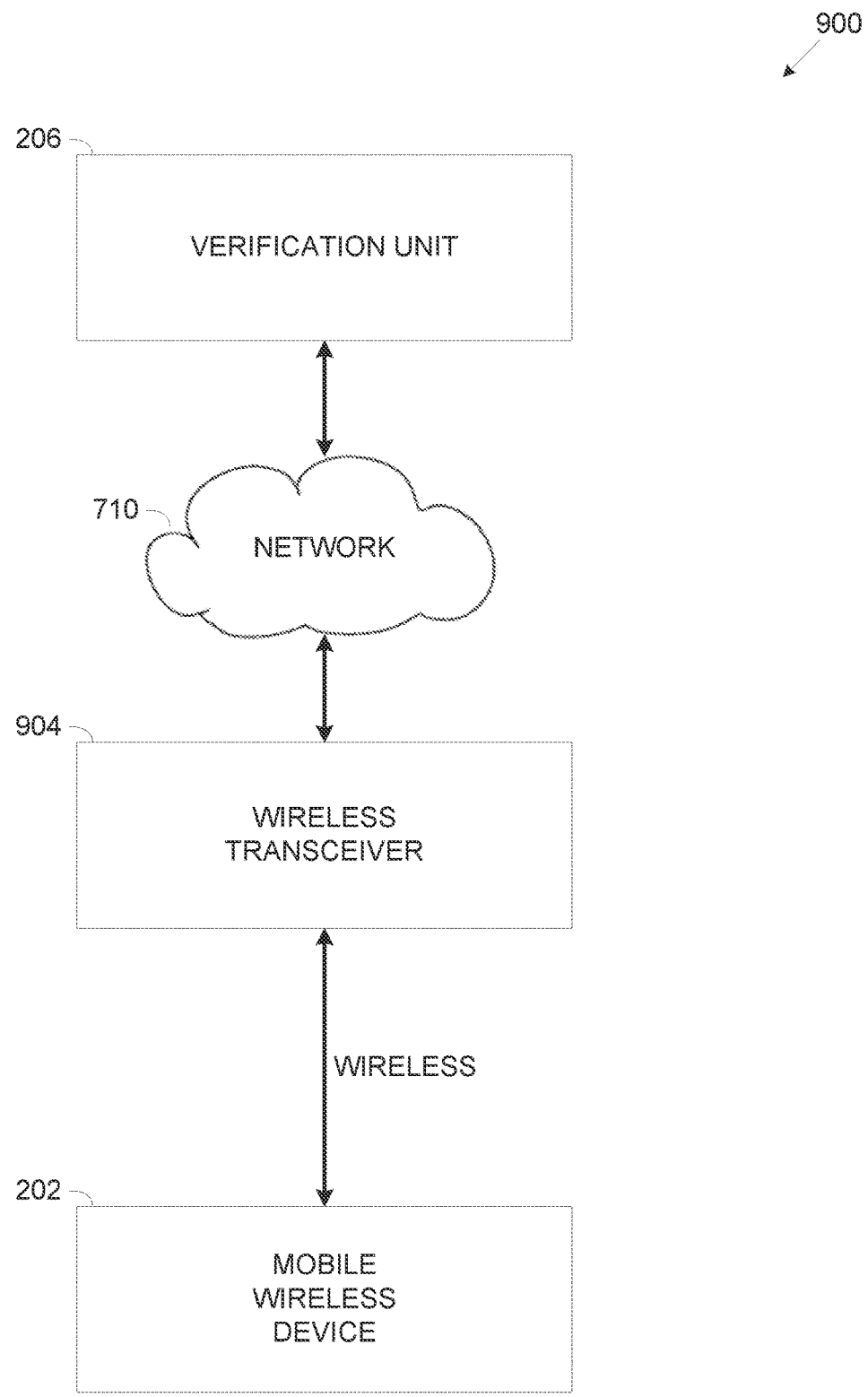
FIG. 9 is a schematic illustration of an exemplary system for authenticating a mobile wireless device based on its geolocation, according to some embodiments of the present invention.

Reference is now made to FIG. 8, which is a flowchart of an exemplary process of authenticating a mobile wireless device based on its geolocation, according to some embodiments of the present invention. Reference is also made to FIG. 9, which is a schematic illustration of an exemplary system for authenticating a mobile wireless device based on its geolocation, according to some embodiments of the present invention.

An exemplary process 800 may be executed by a mobile wireless device such as the mobile wireless device 202 to authenticate itself in order to get access to one or more of the secure assets. In particular, the mobile wireless device 202 may be associated (used, carried, etc.) by a user such as the user 702 which may be granted or denied access to the secure asset(s) based on authentication of his associated mobile wireless device 202.

The mobile wireless device 202, specifically, the user 702 carrying the mobile wireless device 202 may be in a wireless coverage area of one or more wireless receiver 904, for example, a wireless receiver, a cellular base station, a wireless network access point, a wireless network router and/or the like and may thus communicate with the respective wireless receiver 904 which are in transmission range of the mobile wireless device 202.

Each of the wireless receiver 904 which is statically located in a predefined and known geolocation (geographical location) may connect to a network such as the network 710 via one or more wireless and/or wired network interfaces and may thus communicate with one or more network node connected to the network 710. For example, via the network 710, the wireless receiver 904 may communicate with one or more verification units such as the verification unit 206. Optionally, one or more of the wireless receiver 904 provides network connectivity service to the mobile wireless device 202 to the network 710, for example, cellular connectivity Wi-Fi connectivity and/or the like.

One or more of the wireless receiver 904, specifically wireless receiver(s) 904 which having a wireless coverage area covering the geolocation of the mobile wireless device 202 may be in communication with the mobile wireless device 202 attempting to access the secure asset(s) and may execute an exemplary process 820 for interacting with the mobile wireless device 202 to support its authentication. However, each of the wireless receivers 904 may have a limited reception range defining a limited reception area such that only when located within the limited reception area, the respective wireless receiver 904 is capable of communicating with the mobile wireless device 202, specifically intercept signals transmitted by the mobile wireless device 202.

An exemplary process 840 may be executed by the verification unit 206 for authenticating the mobile wireless device 202 based on its geolocation.

The processes 800, 820 and 840 as well as the system 900 are described for a single verification unit 206 authenticating a single mobile wireless device 202 located in a single geolocation and in communication with only a single wireless receiver 904 having a wireless network coverage covering the geolocation of the mobile wireless device 202. This however, should not be construed as limiting since the processes 800, 820 and 840 and complementary the system 900 may be expanded to a plurality of verification units 206 each configured to authenticate a plurality of mobile wireless devices 202 located in a plurality of geolocations which are within the coverage area of a plurality of wireless receivers 904.

As shown at 802, the process 800 executed by the mobile wireless device 202 starts with the mobile wireless device 202 typically operated by the user 702 requesting to access one or more of the secure assets.

As shown at 822, the wireless receiver 904 having a wireless coverage area encompassing the geolocation of the mobile wireless device 202 may receive the access request from mobile wireless device 202 and may further relay the access request to the verification unit 206.

As shown at 842, the verification unit 206 may receive from wireless receiver 904 the access request initiated by the mobile wireless device 202. Optionally, depending on deployment of the verification unit 206 and/or the accessed secure asset(s) as described herein before for the system 700, the verification unit 206 may be in direct communication with the mobile wireless device 202 via its wireless interface 220.

As shown at 806, the mobile wireless device 202 may transmit its device ID via one or more of the wireless channels supported by the wireless interface 210, for example, cellular, WLAN, BT, BLE, ZigBee and/or the like. As described herein before, the device ID transmitted by each mobile wireless device 202 may be uniquely associated with the respective mobile wireless device 202 such that each mobile wireless device 202 may be definitively and unambiguously identified by its associated device ID.

The mobile wireless device 202 may transmit its device ID according to one or more of the transmission and/or timing parameters described herein before, for example, the mobile wireless device 202 may transmit its device ID on event, continuously, periodically and/or the like. The transmission parameters may further define a transmission signal strength, for example, high signal level, standard signal level, low signal strength and/or the like in order to limit the transmission range of the device ID.

As shown at 824, the wireless receiver 904 which having a wireless coverage area covering the geolocation of the mobile wireless device 202 may intercept the device ID transmitted by the mobile wireless device 202.

In particular, the wireless receiver 904 may have a limited reception range defining a limited reception area such that only when located within the limited reception area, the wireless receiver 904 is capable of receiving the device ID transmitted by the mobile wireless device 202. This means that assuming the wireless coverage area of the wireless receiver 904 covers the geolocation of the mobile wireless device 202 and the transmission range of the wireless mobile device 202 is sufficient to reach the wireless receiver 904, the wireless receiver 904 may receive the device ID transmitted by the mobile wireless device 202.

As shown at 826, the wireless receiver 904 transmit to the verification unit 206 one or more location certificates relating to the mobile wireless device 202.

Each location certificate may include at least the device ID of the mobile wireless device 202 and a receiver ID uniquely associated with the wireless receiver 904. The association and/or assignment of the unique receiver ID to the wireless receiver 904 is done using similar methods and techniques described for the wireless transceiver 204 and/or the wireless receivers 504. Optionally, one or more of the location certificate(s) may further include geolocation data relating to the wireless receiver 904, for example, the geolocation of the wireless receiver 904, the coverage rea of the wireless receiver 904 and/or the like.

Optionally, one or more of the location certificate(s) transmitted by one or more of the attached wireless transceiver(s) 204 may further include a timestamp indicative of a transmission time of the respective location certificate from the wireless transceiver 904. The wireless receiver 904 may generate the timestamp based on one or more timing mechanisms as described herein before.

Optionally, one or more of the location certificate(s) transmitted by the wireless receiver 904 may further include an OTP which is valid for a limited time period after which the identity certificate is invalid and hence unusable. The wireless transceiver(s) 904 may apply one or more methods, techniques and/or algorithms as described for the wireless transceiver 204 to create the OTP.

Optionally, one or more of the location certificate(s) transmitted by the wireless receiver 904 may be encrypted according to one or more of the encryption protocols using one or more cryptographic keys which are available to the wireless receiver 904 and known to the verification unit 206 as described herein before for the wireless transceiver 204.

As shown at 844, the verification unit 206 may receive the location certificate(s) generated by the wireless transceiver 904.

As shown at 846, based on the received location certificate(s), the verification unit 206 may verify an expected geolocation of the mobile wireless device 202 compared to the predefined location of the wireless transceiver 904.

Specifically, the verification unit 206 may extract the device ID and the receiver ID from each received location and certificate and may verify the expected location of the mobile wireless device 202 identified by the device ID compared to the predefined location of the wireless receiver 904 identified by the receiver ID. The verification unit 206 may obtain the predefined location of the wireless receiver 904 from one or more location records, for example, a list, a table, a database and/or the like which associate each of a plurality of receiver IDs with a geolocation of a respective one of a plurality of wireless receivers 904.

The verification unit 206 may apply one or more methods, techniques and/or operation modes to verify the expected location of the mobile wireless device 202 which is derived from the known predefined location of the wireless receiver 904 and optionally based on the additional geolocation data relating to the wireless receiver 904.

For example, the verification unit 206 may check whether the geolocation of the mobile wireless device 202 derived from the predefined location of the wireless receiver 904 is listed in one or more white lists, for example, a list, a table, a database and/or the like which may list one or more access geolocations authorized for the user 702 to access the secure asset(s). In other words, the white list(s) may define which geolocations are authorized for the user 702 and hence for his associated mobile wireless device 202 to access the requested secure asset(s). The white list(s) may be locally stored by the verification unit 206 and/or by one or more remote network resources accessible to the verification unit via the network 710. For example, assuming the user 702 using the mobile wireless device 202 is authorized to access a certain service, for example, a secure online database only when located in a certain geolocation, for example, an office of the user 702 which is listed in the white list(s). In such case, the verification unit 206 may determine, based on the predefined location of the wireless receiver 904, whether the mobile wireless device 202 is located in the office of the user 702 or not. For example, in case the receiver ID is associated with a wireless receiver 904 located in proximity to the office of the user 702, for example, a Wi-Fi access point, the verification unit 206 may determine that the mobile wireless device 202 is located in the office and may accordingly verify the mobile wireless device 202. However, in case the receiver ID is associated with a wireless receiver 904 which is not located near the office of the user 702, for example, a cellular base station in another city, the verification unit 206 may determine that the mobile wireless device 202 is not located in the office and may therefore not verify the mobile wireless device 202.

In another example, the verification unit 206 may check whether the geolocation of the mobile wireless device 202 derived from the predefined location of the wireless receiver 904 is listed in one or more black lists which may list one or more geolocations which are not authorized for the user 702 to access the secure asset(s). Therefore, in case the verification unit 206 determines that the geolocation of the mobile wireless device 202 used by the user 702 is one of the blacklisted geolocations not authorized for the user 702 to access the secure asset(s), the verification unit 206 may not verify the mobile wireless device 202, i.e., verification failure. The black list(s) may be stored in one or more storage resources as described for the white lists. For example, assuming the black list(s) list a certain enemy country. In such case, if the verification unit 206 determines, based on the predefined location of the wireless receiver 904, that the mobile wireless device 202 is located in the blacklisted enemy country, the verification unit 206 may not verify the mobile wireless device 202, i.e., fail the verification.

In another example, the verification unit 206 may check whether the geolocation of the mobile wireless device 202 derived from the predefined location of the wireless receiver 904 is a geolocation from which the user 702 previously accessed the secure asset(s) in the past and the geolocation was therefore verified as a valid expected access geolocation. For example, assuming the user 702 successfully accessed the secure asset(s) in the past from a certain location, for example, a certain restaurant. In such case, assuming the verification unit 206 determines, based on the predefined location of the wireless receiver 904, that the mobile wireless device 202 is located in the certain restaurant, the verification unit 206 may successfully verify the mobile wireless device 202. However, in case the user 702 attempts to access the secure asset(s) from a geolocation from which he never accessed the secure asset(s) before the verification unit 206 may again fail verification of the mobile wireless device 202. Moreover, the verification unit 206 may also fail the verification of the mobile wireless device 202 in case the user 702 attempts to access the secure asset(s) from a geolocation which was used to access the secure asset(s) before but a prolonged time period has passed since the last time that the user 702 accessed the secure asset(s) from that geolocation, for example, a month, a year and/or the like.

In another example, the verification unit 206 may estimate and evaluate the expected geolocation of the mobile wireless device 202 based on one or more previous geolocations of the mobile wireless device 202 compared to the predefined location of the wireless receiver 904. The user 702 may travel around thus entering the coverage area of one or more wireless receivers 904 and the mobile wireless device 202 may therefore interact with one or more of these wireless receivers 904. In response to the interaction, the wireless receiver(s) 904 may generate respective location certificate(s) for the mobile wireless device 202. The location certificate(s) created for the mobile wireless device 202 may be stored thus recording previous geolocations of the mobile wireless device 202 at one or more times recorded according to the timestamps of the respective location certificates. When verifying the mobile wireless device 202, the verification unit 206 may retrieve the previous geolocation(s) of the mobile wireless device 202 and compare it with the expected geolocation of the mobile wireless device 202 derived from the predefined location of the wireless receiver 904. In case the extracted receiver ID is associated with a wireless receiver 904 which the mobile wireless device 202 is able to communicate based on the previous geolocation(s), the verification unit 206 may determine that the mobile wireless device 202 is located in a valid expected geolocation and may accordingly verify the mobile wireless device 202. However, in case the extracted receiver ID is associated with a wireless receiver 904 which the mobile wireless device 202 cannot reach based on the previous geolocation(s), the verification unit 206 may determine that the mobile wireless device 202 is not the genuine mobile wireless device 202 but rather a potential malicious impersonator attempting to deceive the verification unit by imitating as the mobile wireless device 202.

For example, assuming the receiver ID extracted from the current location certificate is associated with a first wireless receiver 904 located at a first predefined location and a previous geolocation was recorded for the mobile wireless device 202 based on a previous location certificate received from a second wireless receiver 904 located at a second predefined location. The verification unit 206 may analyze the time span between the generation of the two location certificate with respect to the distance between the first and second predefined locations of the first and second wireless receivers 904 respectively and may verify the mobile wireless device 202 accordingly. This means that mobile wireless device 202 of the user 702 cannot "Teleport" from one geolocation to another distant geolocation. Since the user 702 may typically carry (keep) keep his associated mobile wireless device 202 with him, the mobile wireless device 202 is expected to conform to known and feasible motion and movement patterns. The verification unit 206 may therefore verify the mobile wireless device 202 in case the mobile wireless device follows acceptable and feasible travel patterns and fail verification of the mobile wireless device 202 otherwise.

For example, assuming the distance between the first and second predefined locations is 100 miles and the time period between the recordation of the previous geolocation and the current geolocation is less than 20 minutes, it is not likely that the mobile wireless device 202 was able to travel that fast from the second geolocation to the first geolocation. In such case the verification unit 206 may fail to verify the mobile wireless device 202 and may determine that the access request is made by a potential imposter trying to impersonate as the mobile wireless device 202. In another example, assuming the mobile wireless device 2020 of the user 702 was detected (by one or more wireless receivers 904) at a first geolocation, for example, a first city at 9:00 AM. It is not likely that the same mobile wireless device 202 is detected (by other wireless receiver(s) 904) at a second geolocation, for example, a second city which is distant from the first city, for example 300 kilometers 30 minutes later, i.e. at 9:30 AM since it is not feasible to travel that distance (300 km) within such a short time period (30 minutes). In such case, assuming the user 702 attempts to access the secure asset(s) when located at the second geolocation, the verification unit 206 may determine that the accessing party is not the user 702 but rather a potential malicious party using a mobile wireless device initiating as the mobile wireless device 202 of the user 702 to impersonate as the user 702 in attempt to access the secure asset(s). The verification unit 206 may therefore fail verification of the potential impersonating mobile wireless device.

In another example, the verification unit 206 may estimate and evaluate the expected geolocation of the mobile wireless device 202 based on one or more other geolocations of the mobile wireless device 202 detected by one or more other wireless receivers 904 substantially concurrently with the current detection of the mobile wireless device 202 by the wireless receiver 904 deployed at the predefined location. The substantially concurrent time, for example, 30 seconds, 1 minute, 2 minutes, 5 minutes and/or the like may be determined according to the time stamps included the respective location certificates. In particular, the other wireless receiver(s) 904 is located at another predefined location which is remote from the predefined location of the wireless receiver 904 currently in communication with the mobile wireless device 202 and has a limited reception range such that the mobile wireless device 202 detected by the current wireless receiver 904 cannot be detected by the other wireless receiver(s) 904. This basically means that the mobile wireless device 202 detected cannot be located in two distinct geolocations remote from each other at substantially the same time. In such case, the verification unit 206 may determine that the accessing mobile wireless device 202 may be compromised and/or impersonated by one or meow potentially malicious devices and may accordingly fail the verification of the mobile wireless device 202.

As shown at 848, the verification unit 206 may authenticate the mobile wireless device 202 based on the verification of the mobile wireless device 202. In case the expected geolocation of the mobile wireless device 202 was properly verified, the verification unit 206 may successfully authenticate the mobile wireless device 202. However, in case the verification unit 206 is unable to verify the geolocation of the mobile wireless device 202. The verification unit 206 may fail the authentication of the mobile wireless device 202 thus resulting in an authentication failure.

As described for the process 600, based on an outcome of the authentication, the mobile wireless device 202 may be granted or denied access to the secure asset(s). In particular, in case of successful authentication, the mobile wireless device 202 may be allowed to access the secure asset(s) while in case of unsuccessful authentication, i.e., failed authentication, the mobile wireless device 202 may not be allowed to access the secure asset(s).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms wireless transceivers and receivers and energy harvesting technologies are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of mobile wireless devices authentication, comprising:
   using at least one processor of a mobile wireless device requesting access to at least one secure asset for:
   transmitting a device identifier (ID) of the mobile wireless device via wireless communication channel configured for communication between the mobile wireless device and at least one wireless transceiver independent from the mobile wireless device and attached to the mobile wireless device,
   wherein the mobile wireless device is uniquely associated with the at least one wireless transceiver, and wherein association of the mobile wireless device with the at least one wireless transceiver is predefined and logged in at least one listing record associating each of a plurality of mobile wireless devices with respective at least one wireless transceiver attached to a respective one of the plurality of mobile wireless devices,
   wherein the at least one wireless transceiver having a short transmission range and is a battery-less device powered by energy harvested from wireless transmission of the mobile wireless device via the wireless communication channel;
   receiving via the wireless communication channel at least one identity certificate transmitted, in response to reception of the device ID, by the at least one wireless transceiver, the at least one identity certificate comprising at least the device ID and a transceiver ID of the at least one wireless transceiver; and
   transmitting the at least one identity certificate to at least one verification unit configured to authenticate the mobile wireless device according to the device ID and the transceiver ID, wherein authenticating the mobile wireless device by the at least one verification unit comprising accessing the at least one listing record to determine the association of the mobile wireless device with the at least one wireless transceiver.

2. The method of claim 1, wherein the at least one verification unit is configured to authenticate the mobile wireless device mobile prior to granting the mobile wireless device access to the at least one secure asset, the at least one secure asset is a member of a group consisting of: a secure system, a secure service and a secure location.

3. The method of claim 1, wherein the short transmission range is defined by at least one personal area network (PAN) protocol.

4. The method of claim 1, wherein communication between the mobile wireless device and the at least one wireless transceiver is based on at least one wireless communication protocol, the at least one wireless communication protocol is a member of a group consisting of: wireless local area network (WLAN), Wi-Fi, Bluetooth, Bluetooth low energy (BLE) and ZigBee.

5. The method of claim 1, wherein the short transmission range defines a close proximity reception area such that only when located within the close proximity reception area, the mobile wireless device is capable of receiving the at least one identity certificate transmitted by the at least one wireless transceiver.

6. The method of claim 5, wherein the close proximity reception area is defined by a radius in a range of 5-30 centimeters.

7. The method of claim 1, wherein the device ID is transmitted on event, periodically and/or continuously.

8. The method of claim 1, wherein the at least one identity certificate further comprises a timestamp indicative of a transmission time of the at least one identity certificate.

9. The method of claim 1, wherein the at least one identity certificate comprises a one-time password (OTP) randomly generated based on seed associated with the at least one wireless transceiver.

10. The method of claim 1, further comprising the at least one identity certificate is encrypted using at least one cryptographic key associated with the at least one wireless transceiver.

11. A mobile wireless device, comprising:
at least one processor configured to execute a code, the code comprising:
code instructions to transmit a device identifier (ID) of the mobile wireless device via wireless communication channel configured for communication between the mobile wireless device and at least one wireless transceiver independent from the mobile wireless device and attached to the mobile wireless device,
wherein the mobile wireless device is uniquely associated with the at least one wireless transceiver, and wherein association of the mobile wireless device with the at least one wireless transceiver is predefined and logged in at least one listing record associating each of a plurality of mobile wireless devices with respective at least one wireless transceiver attached to a respective one of the plurality of mobile wireless devices,
wherein the at least one wireless transceiver having a short transmission range and is a battery-less device powered by energy harvested from wireless transmission of the mobile wireless device via the wireless communication channel;
code instructions to receive via the wireless communication channel at least one identity certificate transmitted, in response to reception of the device ID, by the at least one wireless transceiver, the at least one identity certificate comprising at least the device ID and a transceiver ID of the at least one wireless transceiver; and
code instructions to transmit the at least one identity certificate to at least one verification unit configured to authenticate the mobile wireless device according to the device ID and the transceiver ID, wherein authenticating the mobile wireless device by the at least one verification unit comprising accessing the at least one listing record to determine the association of the mobile wireless device with the at least one wireless transceiver.

* * * * *